(12) United States Patent
Klefenz et al.

(10) Patent No.: US 7,948,493 B2
(45) Date of Patent: May 24, 2011

(54) APPARATUS, METHOD AND COMPUTER PROGRAM FOR DETERMINING INFORMATION ABOUT SHAPE AND/OR LOCATION OF AN ELLIPSE IN A GRAPHICAL IMAGE

(75) Inventors: Frank Klefenz, Mannheim (DE); Johannes Katzmann, Waltha-Farnroda (DE); Christian Holland-Nell, Steinbach-Hallenberg (DE); Peter Husar, Homburg (DE)

(73) Assignees: Fraunhofer-Gesellschaft zur Foerderung der angewandten Forschung e.V., Munich (DE); Technische Universitaet e.V., Ilmenau (DE)

( * ) Notice: Subject to any disclaimer, the term of this patent is extended or adjusted under 35 U.S.C. 154(b) by 1014 days.

(21) Appl. No.: 11/732,539

(22) Filed: Apr. 3, 2007

(65) Prior Publication Data
US 2008/0012860 A1 Jan. 17, 2008

(30) Foreign Application Priority Data

Sep. 30, 2005 (DE) .......................... 10 2005 047 160
Sep. 27, 2006 (WO) ................. PCT/EP2006/009387

(51) Int. Cl.
*G06T 11/20* (2006.01)
(52) U.S. Cl. ........................................ 345/441; 345/469
(58) Field of Classification Search .................... 345/441
See application file for complete search history.

(56) References Cited

U.S. PATENT DOCUMENTS
3,069,654 A 12/1962 Hough 6,233,351 B1 * 5/2001 Feeney et al. ................. 382/155
7,403,669 B2 7/2008 Aoyama
2009/0080699 A1 3/2009 Ng-Thow-Hing et al.

FOREIGN PATENT DOCUMENTS
DE 19750835 A1 11/1997
EP 1032891 B1 5/1999
EP 1178434 A 2/2002

OTHER PUBLICATIONS

Contour-based partial object recognition using symmetry in image databases June-Suh Cho, Joonsoo Choi Mar. 2005 SAC '05: Proceedings of the 2005 ACM symposium on Applied computing.*
A fast contour-based approach to circle and ellipse detection Wenchao Cai; Qian Yu; Hong Wang; Intelligent Control and Automation, 2004. WCICA 2004. Fifth World Congress on vol. 5 Publication Year: 2004 , pp. 4686-4690 vol. 5.*

(Continued)

*Primary Examiner* — Javid A Amini
(74) *Attorney, Agent, or Firm* — Michael A. Glenn; Glenn Patent Group

(57) ABSTRACT

An apparatus for determining information about shape and location of an ellipse involves determining two coordinates of a first ellipse point representing a point of the ellipse located furthest in the first direction, and determining two coordinates of a second ellipse point representing a point of the ellipse located furthest in a direction opposite to the first direction. The apparatus determines parameters of bent line segments approximating the ellipse at ellipse points or in a surrounding of ellipse points, and determines the coordinates of ellipse points based on the parameters of the bent line segments. The apparatus involves calculating ellipse parameters of the ellipse based on the two coordinates of the first ellipse point and the two coordinates of the second ellipse point. The apparatus enables real-time-capable determination of parameters of an ellipse included in an image to be analyzed.

34 Claims, 18 Drawing Sheets

OTHER PUBLICATIONS

Improving ellipse detection using a fast graphical method Elmowafy, O.M.; Fairhurst, M.C.; Electronics Letters vol. 35, Issue: 2 Digital Object Identifier: 10.1049/el:19990095 Publication Year: 1999, pp. 135-137.*

Extraction of Circles from Arcs Segmented into Short straight lines. Euijin Kim, Miki Haseyama, and Hideo Kitajima, Member, IEEE, 2002.*

Adaptive fuzzy c-shells clustering and detection of ellipses by Rajesh N Dave et al. 1992.*

Chun-Ta Ho; Ling-Hwei Chen "A high-speed algorithm for elliptical object detection", Image Processing, IEEE Transactions on. vol. 5, Issue 3, Mar. 1996, pp. 547-550.

Euijin Kim, Mike Haseyama, Hideo Kitajima "Fast and Robust Ellipse Extraction from Complicated Images", Int. Conference on Information Technology & Application(ICITA 2002).

Paul V.C. Hough "Machine Analysis of Bubble Chamber Pictures" (proceedings of the International Conference on high-energy accelerators and instrumentation, L. Kowarski, editor, Geneva, Sep. 14-19, 1959).

Okabe Mitsuo, et al. "Automatic Detection of Circular Objects by Ellipse Growing", IEICE Transactions, Japan, The Institute of Electronics, Information and Communication Engineers, Dec. 2002, vol. J85-D-II, issue 12, pp. 1823-1831.

M. Takatsu, H. Okamoto, S. Kawakami, N. Yokoyama "Circuit Integration of the Local Hough Transform Performed by a Neural Network of the Primary Visual Cortex" FED vol. 9 No. 2 (1998), 3 pages.

Japanese Office Action, with English Translation, mailed on May 17, 2010 for related Japanese application No. 2008-532660, 5 pages.

Goneid, A. et al.; "A Method for the Hough Transform Detection of Circles and Ellipses Using a 1-Dimensional Array"; Oct. 1997; IEEE Int'l Conf. on Systems, Men and Cybernetics, Orlando, FL, pp. 3154-3157.

Ho, Chun-Ta et al.; "A Fast Ellipse/Circle Detector Using Geometric Symmetry"; Jan. 1995; Pattern Recognition, vol. 28, No. 1, pp. 117-124, Elsevier Science Ltd.

Wong, A.K.C. et al.; "Robotic Vision: 3D Object Recognition and Pose Determination"; Oct. 1998; IEEE Int'l Conf. on Intelligent Robots and Systems; Victoria, BC, Canada, pp. 1202-1209.

Klefenz, et al.; "VLSI Implementation of a Parallel Hough Transformation Processor with Dynamically Reloadable Patterns"; May 1995, Technical Report TR-95-022, University of Mannheim, 4 pages.

* cited by examiner

FIGURE 2A
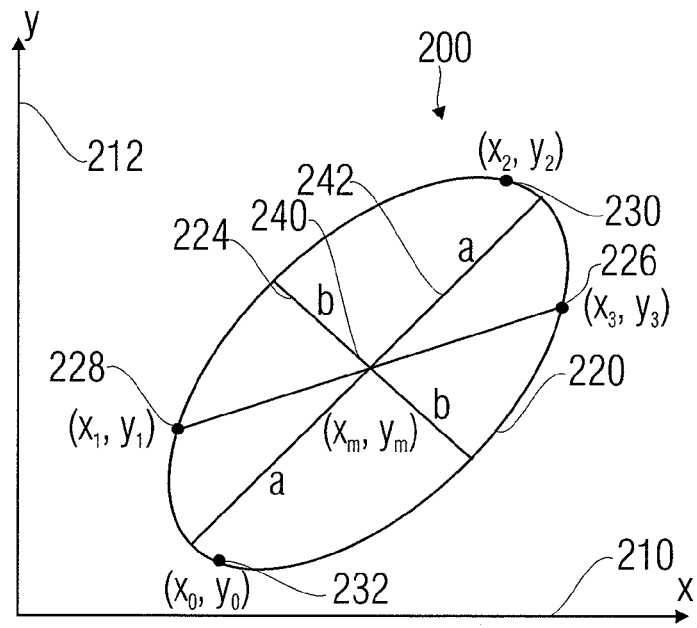
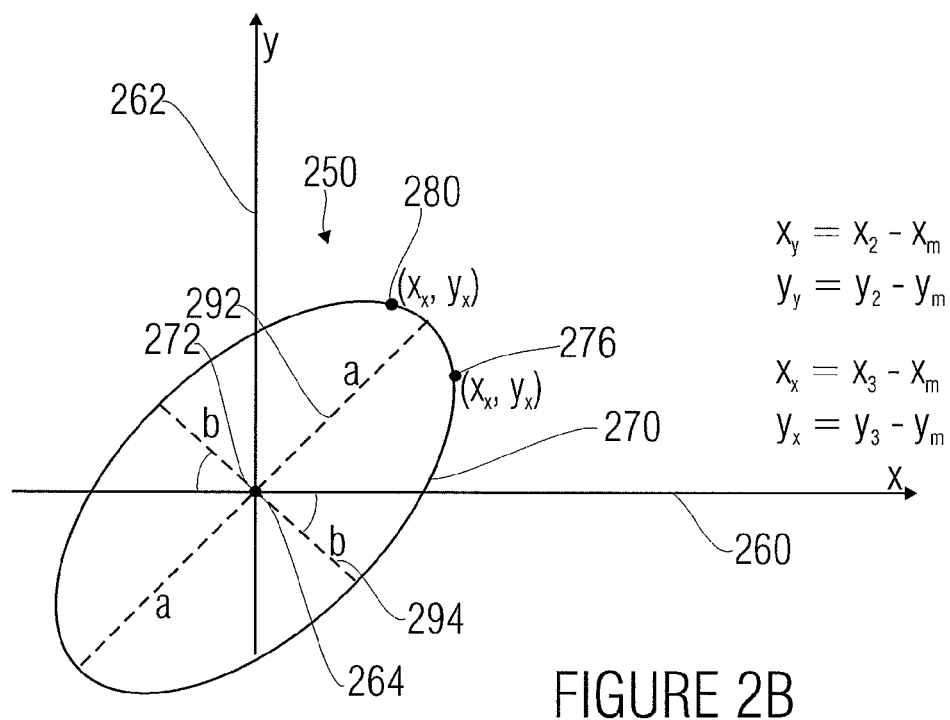
$X_y = X_2 - X_m$
$Y_y = Y_2 - Y_m$
$X_x = X_3 - X_m$
$Y_x = Y_3 - Y_m$
FIGURE 2B

APPARATUS, METHOD AND COMPUTER PROGRAM FOR DETERMINING INFORMATION ABOUT SHAPE AND/OR LOCATION OF AN ELLIPSE IN A GRAPHICAL IMAGE

The present invention generally relates to an apparatus, a method and a computer program for determining information about shape and/or location of an ellipse in a graphical image, in particular to a concept for real-time ellipse recognition.

Ellipse recognition is applicable wherever circular objects have to be located in space, because circular objects are mapped as ellipses depending on the viewing angle. For example, in medical technology, the ellipse recognition is employed for determining the viewing direction. From an exact position of the ellipse-shaped mapping of the circular pupil, the position of the eye (eye tracking), and hence the viewing direction of a human (or an animal), can be inferred. In technology, in general, ellipse recognition is required e.g. for location tasks of objects or for the recognition of bore holes, filler necks, food, such as fruits, or piece goods, such as machine components or coffee cups.

Prior to a recognition of an ellipse in an input image (also referred to as ellipse fitting), the input image is transformed to a binary edge image via a threshold value and an edge operator or via an edge operator and a threshold value. The edge image obtained thereby contains the artifact-disturbed, incomplete contour of the ellipse.

It is pointed out that several methods for the recognition of ellipses are known according to the prior art. For example, for the recognition of an ellipse, a direct fit, in which a square deviation is minimized (also referred to as direct least-square-fitting), may be used. In such a direct ellipse fitting according to Fitzgibbon, all edge points of the binary edge image are input for a direct computation of the ellipse parameters. Following the application of the corresponding calculation rule, the ellipse parameters describing the point set (that is, all edge points of the binary edge image or at least of a portion of the edge image) in the best way are output. Here, a sum of deviation squares among points of the binary edge image and a fitted ellipse is minimized.

In the method described, each point used, that is, for example, each point included in the edge image, has an influence on the ellipse parameters to be calculated. Spurious points, which do not belong to an ellipse to be identified, cause great deviation of the ellipse parameters through their great distance to the ellipse to be identified, because a distance square of the spurious points from the ellipse (or from the center of the ellipse) has a decisive influence on the amount of the deviation of the ellipse parameters. An advantage of the method described is high achievable execution speed. Disadvantages of the method described consist in the fact that the ellipse to be identified has to be isolated from spurious edges and/or artifacts in the edge image in an intensive manner prior to processing. To this end, spurious edges and artifacts have to be capable of being differentiated from ellipses. A further disadvantage of the method described consists in the fact that neither the duration of the direct ellipse fitting nor the duration of pre-processing is independent of image content. For the real-time ellipse recognition from video data, for this reason time always has to be reserved to be able to process even intensive images. Only in this way can the processing of all images of a video data stream be guaranteed.

Furthermore, it is pointed out that a so-called Hough transform has been presented by Paul V. C. Hough in the article "Machine Analysis of Bubble Chamber Pictures" (Proceedings of the International Conference on high-energy accelerators and instrumentation, L. Kowarski, editor, Geneva, $14^{th}$-$19^{th}$ Sep. 1959). The Hough transform is also described further in the U.S. Pat. No. 3,069,654 entitled "Method and means for recognizing complex patterns".

Furthermore, European patent specification EP 1 032 891 B1 describes a method and means for detecting and making signal shapes coincidental, said shapes being convertible into monotone and constant trajectories in a section-by-section manner.

With the application of the Hough transform, the curves to be recognized have to be described in a parameter-dependent form, that is, in form of a parameterized (curve) equation. For example, a straight line may be described by a straight-line equation of the form of $$y=mx+n;$$

x,y—axes;
m,n—straight-line parameters.

Similarly, a circle can be described by a circle equation of the form of $$r^2=(x-x_0)^2+(y-y_0)^2;$$

x,y—axes;
$x_0$, $y_0$—coordinates of the center;
r—radius.

The features from the edge image already described, the image points (x, y) in the simplest case, are inserted into the curve equation in the Hough transform, and then those parameter combinations solving the respective equation or curve equation are determined. These solution sets or "votes", which designate the possible parameter combinations, are entered on top of each other into an accumulator space. If all points lie on a curve that can be described by the parameter-dependent curve equation (for certain parameter values) used in the Hough transform, the intersection of all solution sets of the parameter combination corresponds to the curve sought. In general, high values in the accumulator describe frequent parameter combinations. Their accumulator coordinates thus describe parameter combinations of the curves found. The accumulator used has as many dimensions here as the curve equation has free parameters.

In the following, the method of the standard Hough transform for the identification of an ellipse or for the determination of the ellipse parameters of an ellipse will be described. It is pointed out that an ellipse is described with five different (scalar and real-value) parameters. Here, two center coordinates of the ellipse, usually referred to as $x_0$ and $y_0$ or as $x_m$ and $y_m$, two semiaxial lengths, usually designated with a and b, and the rotational angle of the ellipse, typically designated with $\alpha_{rota}$, are used. As such, the parameters are usually related to a (preferably rectangular) reference coordinate system.

The votes belonging to a chosen point of the edge image consist of combinations of the five parameters, which all describe an ellipse through the presently chosen point of the edge image, when applying the standard Hough transform. The votes are cumulatively added in a five-dimensional accumulator. After processing all edge points in the edge image, the maximum in the accumulator describes the ellipse parameters of an ellipse present in the edge image. The advantages of the method described are reliable and robust recognition of the ellipses present in the edge image and high independence of disturbances in the edge image.

A disadvantage of the described method according to the standard Hough transform is the extremely long and image-content-dependent computation time. For each edge point, all combinations of values from five value ranges have to be taken into account, wherein the five value ranges describe the above-mentioned parameters of the ellipse. A further disadvantage of the method described is extremely high storage requirement. The five-dimensional accumulator used consists of $n=n_{x0} \cdot n_{y0} \cdot n_a \cdot n_b \cdot n_{rota}$ elements, with $n_x$ describing the number of discrete possible values examined of the x coordinate of the ellipse center, and with $n_{y0}$, $n_a$, $n_b$ and $n_{rota}$ further indicating the number of possible discrete parameter values for the remaining ellipse parameters. Furthermore, it is to be pointed out that a further disadvantage of the use of the standard Hough transform for the recognition of ellipses consists in the intensive implementation with few possibilities for parallelization of the computation.

It is to be pointed to the fact here that, with respect to the application of the Hough transform for the identification of ellipses, there exist variants in which the parameter space becomes restricted. The value ranges of the parameters are reduced by knowledge of the ellipse to be sought, for example. Such previous knowledge may be derived from the evaluation of previous video images or from knowledge of the mapping geometry and the objects to be mapped. Furthermore, the storage of the five-dimensional accumulator may be bypassed by a division into two-dimensional layers with constant parameter values (a, b, $\alpha_{rota}$). The two-dimensional layers with constant parameter values (a, b, $\alpha_{rota}$) may be processed separately here. Furthermore, it is possible to use not all features (or edge points). Rather, it may be sufficient to perform a random selection of the points. This procedure is referred to as randomized Hough transform.

Furthermore, methods for the division of the parameter space in connection with the Hough transform are known. Likewise, gradient-based methods exist. In these methods, the features no longer consist of individual points or single points, but of groups of two points as well as accompanying directions of the gray-scale gradients. For this reason, the method is referred to as gradient-based method. Through the higher-dimensional features mentioned, the accumulator simplifies to two-dimensional accumulators (per center and rotation/axis ratio) and a one-dimensional accumulator (ellipse size). An advantage of the method mentioned is a dramatic reduction in processing time as opposed to the standard Hough transform. Disadvantages of the method consist in the fact that gradient operators additionally have to be applied to the gray-scale image, and that no longer merely a linear dependence of the computation time on the number of edge points is given, but a square one, because preferably all groups of two points must be formed. Thereby, the efficiency in real-time processing decreases. A further disadvantage of the method described consists in the intensive implementation. Furthermore, there are only few possibilities of parallelization of the computation.

In view of the above-described prior art, it therefore is the object of the present invention to provide a concept for determining information about shape and/or location of an ellipse in a graphical image, which allows for quick determination of at least one ellipse parameter of an ellipse present in the graphical image.

This object is achieved by an apparatus for determining information about shape and/or location of an ellipse in a graphical image according to claim 1, a method according to claim 32, and a computer program according to claim 33.

The present invention provides an apparatus for determining information about shape and/or location of an ellipse in a graphical image, wherein the image has a first direction and a second direction, with a coordinate determination means for determining two coordinates of a first ellipse point representing a point of the ellipse located furthest in the first direction, and for determining two coordinates of a second ellipse point representing a point of the ellipse located furthest in a direction opposite to the first direction. The coordinate determination means is further formed to determine at least one parameter of a first bent line segment approximating the ellipse at the first ellipse point or in a surrounding of the first ellipse point, and to determine the coordinates of the first ellipse point based on the at least parameter of the first bent line segment. The coordinate determination means is further formed to determine at least one parameter of a second bent line segment approximating the ellipse at the second ellipse point or in a surrounding of the second ellipse point, and to determine the coordinates of the second ellipse point based on the at least one parameter of the second bent line segment. Furthermore, the inventive apparatus includes an ellipse calculation means for calculating at least one ellipse parameter of the ellipse based on the two coordinates of the first ellipse point and the two coordinates of the second ellipse point. The at least one ellipse parameter here represents the information about the shape and/or the location of the ellipse. The parameter of a bent line segment here describes the location and/or the shape of the bent line segment.

It is the key idea of the present invention that it is advantageous to divide the determination of parameters of an ellipse present in a graphical image into several steps including both the identification of labeled ellipse points in the graphical image by the coordinate determination means and the execution of analytical calculations by the ellipse calculation means. Here, the present invention is based on the finding that parameters of an ellipse can be determined if the coordinates of two points belonging to the ellipse, which represent the points of the ellipse located furthest in a first direction and in a direction opposite to the first direction are known. The first ellipse point and the second ellipse point thus represent labeled points in the given coordinate system, which is fixed by the first direction and the second direction, and may also be referred to as "extreme points", because they have associated therewith the property of being located furthest in the first direction and in the direction opposite to the first direction. Furthermore, it has been realized that an ellipse to be identified can be approximated by a corresponding bent line segment with which parameters regarding the location and/or curvature can be associated, in the surrounding of the first ellipse point and the second ellipse point, that is generally in the surrounding of the extreme points each. Furthermore, it has proven to be advantageous to determine at least one parameter of the first bent line segment approximating the ellipse at the first ellipse point or in the surrounding of the first ellipse point, and to determine the coordinates of the first ellipse point based on the at least one parameter of the first bent line segment. This is advantageous insofar as, when determining the parameter of the first bent line segment, it is indeed sebent for a curve course capable of approximating the ellipse at the first point. Thus, it is ensured that the first ellipse point can be identified in reliable manner, because the first ellipse point is identified by a bent line segment approximating the ellipse at the first ellipse point, and not by an individual point. Thereby, it is ensured that disturbances in the graphical image (for example additional edges or other artifacts) do not compromise the recognition of the first ellipse point. Similarly, also the coordinates of the second ellipse point can be identified in particularly reliable manner by defining the second ellipse point by a bent line segment approximating the ellipse at the second ellipse point or in the surrounding of the second ellipse point. The parameters of the bent line segments, which for example indicate location and/ or curvature of the bent line segments, may here be used for inferring coordinates of the first ellipse point and of the second ellipse point. Thus, in an analytical calculation step, based on the determined coordinates of the first ellipse point and the second ellipse point, at least one parameter of the ellipse may finally be calculated, wherein very little computation effort arises.

The inventive concept for determining information about the shape and/or the location of an ellipse in the graphical image thus combines the advantages of a pattern-recognizing method, in which parameters of bent line segments approximating the ellipse at the first ellipse point or at the second ellipse point are determined, with the velocity advantages of an analytical computation.

By the determination of parameters of a bent line segment approximating the ellipse at the first ellipse point or at the second ellipse point, it may be ensured here that the first ellipse point and the second ellipse point are recognized in a very reliable manner. Individual spurious points are suppressed here, because they do not or not substantially affect the determination of parameters of a bent line segment, that is the determination of parameters of a geometrically well-defined object.

Furthermore, it is to be pointed out that a bent line segment can be described by a small amount of parameters, for example by two scalar location parameters and one shape parameter, which for example describes a curvature, whereas five parameters are required for the description of the entire ellipse. Thus, parameters of the line segments approximating the ellipse at the first ellipse point and at the second ellipse point can be determined with substantially lower computation effort than the parameters of the ellipse itself. In other words, the problem of the recognition of a geometrical figure with five parameters (namely an ellipse) is reduced to the problem of the recognition of at least two bent line segments with two or three unknown parameters at the most, followed by an analytical computation. Identification of a bent line course (or a bent line segment), which is characterized by two or three parameters, however, has significantly less complexity than the identification of a curve course characterized by five parameters. For this reason, the inventive method is substantially quicker and can be realized with less effort than conventional efforts.

Furthermore, by the identification of bent line segments, the inventive method hardly is sensitive to individual spurious points in the graphical image or to straight-line courses included in the graphical image in addition to the ellipse sought. It is pointed out that the inventive method thus is suited for real-time-capable ellipse recognition.

Furthermore, it is pointed out that the identification of parameters of bent line courses approximating the ellipse to be identified can be realized very efficiently in hardware, wherein there is great potential for parallelization. On the other hand, the ellipse calculation means has to process a smaller amount of data as compared with the conventional solution and may thus be realized with less effort.

Finally, the inventive concept for determining information about the shape and/or location of an ellipse in a graphical image generally also is very well suited for parallelization, because a great number of computations can be executed at the same time.

In a further preferred embodiment, the coordinate determination means is formed to further determine at least one coordinate of a third ellipse point representing a point of the ellipse located furthest in the second direction. The coordinate determination means in this case is preferably formed to at least determine one parameter of a third bent line segment approximating the ellipse at the third ellipse point or in a surrounding of the third ellipse point, and to determine a coordinate of the third ellipse point based on the at least one parameter of the third bent line segment. Furthermore, the ellipse calculation means in this case is preferably formed to calculate at least one ellipse parameter of the ellipse based on the two coordinates of the first ellipse point, the two coordinates of the second ellipse point, and the one coordinate of the third ellipse point.

After all, it has been shown that all parameters of the ellipse can be calculated with the knowledge of two coordinates of the first ellipse point, of two coordinates of the second ellipse point, and of at least one coordinate of the third ellipse point. Thus, apart from the center coordinates of the ellipse, which can already be determined from the first ellipse point and the second ellipse point alone, also a length of a first semiaxis, a length of a second semiaxis, as well as a rotation (or rotational angle) of the ellipse can be calculated. The use of at least one coordinate of the third ellipse point thus enables complete characterization of the ellipse.

In the further preferred embodiment, the image is a raster image including a plurality of image points arranged in a plurality of raster rows and/or in a plurality of raster columns. Here, the ellipse also is described by a plurality of image points, which form ellipse points. The first bent line segment, the second bent line segment and/or the third bent line segment here can be described by a plurality of adjacent image points. Furthermore, it is preferably started from the assumption that a bent line segment is described by at least three, but better at least four adjacent image points. The description of a line segment by several image points allows for especially advantageous execution of a pattern recognition, in order to identify the first line segment, the second line segment or the third line segment, and to determine the parameters thereof.

Furthermore, it is preferred that the coordinate determination means is formed to perform a pattern recognition using the raster rows and/or the raster columns of the image, in order to identify a curve course forming the first bent line segment, in an image excerpt of the image to be analyzed, which is formed by a plurality of raster rows and/or raster columns. Here, it is to be noted that the image excerpt of the image to be analyzed may also be the entire image. Furthermore, it is to be noted that the coordinate determination means preferably is formed to identify a curve course or two curve courses forming the second bent line segment and/or the third bent line segment in the image excerpt to be analyzed.

Furthermore, the coordinate determination means preferably is formed to determine at least one parameter, for example a location parameter (for example x coordinate and/or y coordinate) and/or a shape parameter (for example a radius of curvature) of the identified curve course. After all, it has been shown that a curve course forming the first bent line segment or the second bent line segment or the third bent line segment can be identified in especially preferable manner in a rasterized image. After all, in a rasterized image, by configuration of a pattern recognition means for the recognition of given rasterized comparison patterns, it is possible in especially easy way to describe bent curve courses approximating an ellipse at the first ellipse point, the second ellipse point and/or the third ellipse point.

Furthermore, it is preferred that the coordinate determination means is formed to identify, using the raster rows and/or raster columns in the image excerpt of the image to be analyzed, which is formed by a plurality of raster rows and/or raster columns, the curve course forming the first bent line segment by checking whether the image excerpt to be analyzed contains a curve course sufficiently similar to a reference curve course from a set of possible reference curve courses with reference to a given similarity measure, wherein the set of reference curve courses describe admissible courses of the first bent line segment for various parameters of the first line segment. Similarly, the coordinate determination means may preferably be formed to identify, in an image excerpt of the image to be identified, curve courses forming the second bent line segment and/or the third bent line segment. The given similarity measure may for example prescribe that at least a given number of image points of a curve course present in the image excerpt to be analyzed match image points belonging to the respective reference curve course. Similarly, it may be specified that the curve course included in the image excerpt to be analyzed is sufficiently similar to the considered reference curve course, if it is found that distances between image points of the curve course included in the image excerpt to be analyzed from image points of the considered reference curve course are smaller than a given threshold. But any other similarity measure that can be employed within the scope of a pattern recognition may also be used. For example, a curve course included in the image excerpt to be analyzed may be regarded as sufficiently similar to a considered reference curve course, if a curve course that develops in the application of an operator to the curve course included in the image excerpt is sufficiently similar to a comparative curve course. The operator may for example be a bend operator, and the comparison curve course may for example be a straight line.

Furthermore, it is preferred that the coordinate determination means is formed to apply a pattern recognition to a plurality of image excerpts of the image to be analyzed, in order to identify a curve course forming the first bent line segment, and to determine the location parameter of the first bent line segment based on in which of the image excerpts of the image the first bent line segment is identified. In other words, it is preferred to divide an entire image to be examined in a plurality of image excerpts of the image to be analyzed, and then separately apply pattern recognition to the several image excerpts to be analyzed. After all, it has been shown that, for the determination of the parameters of bent line segments approximating the ellipse at the first ellipse point, at the second ellipse point or at the third ellipse point, it is sufficient to consider a small excerpt of the image. Here, it is to be taken into account that the ellipse can be approximated with a previously known bent line segment (from a set of reference curve courses, if necessary) sufficiently well only in a limited surrounding of the first ellipse point, the second ellipse point or the third ellipse point. For this reason, the analysis of a small image excerpt is especially advantageous and does not deteriorate the quality in the identification of the coordinates of the first ellipse point, the second ellipse point and the third ellipse point. Furthermore, the use of a plurality of image excerpts to be analyzed is particularly advantageous, because thereby a location parameter of the curve course to be identified can remain unconsidered within the scope of the actual pattern recognition. In other words, the possible reference curve courses may all be identical with reference to a location parameter, because indeed several image excerpts differing with reference to exactly this location parameter are used. Thus, for the analysis of each image excerpt of the plurality of image excerpts, a low-intensity pattern recognition method can be employed, wherein a location parameter of the bent line segment to be identified is determined by shifting the image excerpt to be analyzed, i.e. that a further image excerpt shifted as opposed to the previously analyzed image excerpt is analyzed.

Furthermore, it is preferred that the coordinate determination means is formed to apply the pattern recognition to a plurality of image excerpts of the image to be analyzed, wherein at least two image excerpts of the plurality of image excerpts to be analyzed overlap. The overlap of image excerpts to be analyzed leads to the fact that a location parameter (for example an x coordinate or a y coordinate) of the curve course to be identified can be determined by the use of overlapping image excerpts to be analyzed alone. For example, the image excerpts to be analyzed may each be shifted with respect to each other by only one or two image points or raster rows or raster columns.

Furthermore, it is preferred that the plurality of possible reference curve courses describes curve courses differing with reference to the location and/or shape, wherein at least one parameter characterizing the location and/or position is associated with the curve courses of the plurality of possible reference curve courses, and wherein the coordinate determination means is further formed to derive the parameter of the curved line segment approximating an ellipse to be identified at the first ellipse point, the second ellipse point or the third ellipse point, from the fact which of the curve courses from the plurality of possible reference curve courses is sufficiently similar to the curve course included in the image excerpt to be analyzed with reference to the similarity measure. Thus, within the scope of the pattern recognition, parameters of a bent line segment cannot only be derived from the fact in which image excerpt a reference curve course can be identified, but also from the fact which of several possible reference curve courses can be identified in the image excerpt to be analyzed. This may lead to simplification and/or acceleration of the pattern recognition. Parallelization of the pattern recognition may also be improved hereby.

Furthermore, it is preferred that the curve courses from the plurality of possible reference curve courses are chosen so that they approximate ellipses of different shapes and/or locations at the first ellipse point and/or the second ellipse point and/or the third ellipse point. The curve courses from the plurality of possible curve courses may thus, for example, also be unsymmetrical, because the ellipse generally is approximated by an unsymmetrical bent line course or by an unsymmetrically bent line segment at the first ellipse point, the second ellipse point or the third ellipse point.

In another preferred embodiment, however, it is preferred that the curve courses from the plurality of possible reference curve courses are chosen so that they describe excerpts from circular lines of different location and/or different radius. After all, it has been shown that ellipses of arbitrary location generally can be approximated sufficiently well by an excerpt from a circular curve at the first ellipse point, the second ellipse point or the third ellipse point, or in a sufficiently small surrounding of the first ellipse point, the second ellipse point or the third ellipse point. Likewise, it has been shown that a comparably small amount of excerpts from circular curves of different location and/or different radius is sufficient to approximate ellipses of highly different axis ratio and with different rotational angles sufficiently well. Furthermore, excerpts from circular curves are suited particularly well for the employment in a pattern recognition means due to the symmetry.

In other words, it is preferred that the first bent line segment is an excerpt of an at least approximately circular line approximating the ellipse at the first ellipse point or in the surrounding of the first ellipse point, and/or that the second bent line segment is an excerpt from an at least approximately circular line approximating the ellipse at the second ellipse point or in the surrounding of the second ellipse point, and/or that the third bent line segment is an excerpt from an at least approximately circular line approximating the ellipse at the third ellipse point or in a surrounding of the third ellipse point.

In a further preferred embodiment, the coordinate determination means is specified so as to further determine, as an additional coordinate, at least a further coordinate of the third ellipse point or at least one coordinate of a fourth ellipse point representing a point of the ellipse located furthest in a direction opposite to the second direction, wherein the ellipse calculation means is formed to calculate a first set of ellipse parameters including at least one ellipse parameter based on the two coordinates of the first ellipse point, the two coordinates of the second ellipse point and the first coordinate of the third ellipse point, as well as to calculate a second set of ellipse parameters including at least one ellipse parameter based on the two coordinates of the first ellipse point, the two coordinates of the second ellipse point and the additional coordinate, and to calculate a result set of ellipse parameters by averaging, using the first set of ellipse parameters and the second set of ellipse parameters. The result set of ellipse parameters here represents the information about the shape and/or the location of the ellipse in the graphical image. In other words, by a calculation of the additional coordinate, which typically is easily possible, two sets of ellipse parameters may be calculated. By averaging, the accuracy in the calculation of the ellipse parameters can be improved here. Otherwise, it is possible to find out whether a deviation between the first set of ellipse parameters and the second set of ellipse parameters is greater than a given deviation. To this end, any mathematical norm or another criterion for the determination of a deviation can be used. If an excessively large absolute deviation or relative deviation between the first set of ellipse parameters and the second set of ellipse parameters is found, an error message indicating that the calculation of the ellipse parameters is inaccurate further can be output. The inaccuracy may for example result from inaccurate determination of the first ellipse point, the second ellipse point, the third ellipse point or the fourth ellipse point. Significant inaccuracy may also arise, if the three or four ellipse points do not belong to the same ellipse. In case of excessive deviation between the first set of ellipse parameters and the second set of ellipse parameters, i.e. if the deviation is greater than a given threshold, it may thus be signaled that faulty recognition or association of the ellipse points is present.

In a further preferred embodiment, the coordinate determination means is formed to determine two coordinates of the third ellipse point representing a point of the ellipse located furthest in the second direction, and two coordinates of the fourth ellipse point representing a point of the ellipse located furthest in a direction opposite to the second direction. Furthermore, the ellipse calculation means may be formed to select a plurality of different sets of three ellipse points from the first ellipse point, the second ellipse point, the third ellipse point and the fourth ellipse point, in order to determine accompanying sets of ellipse parameters for the several selected sets of ellipse points, and in order to calculate an average set of ellipse parameters by averaging the sets of ellipse parameters belonging to the sets of ellipse points as information about the shape and/or location of the ellipse. The described implementation of the apparatus for determining information about shape and/or location of an ellipse in a graphical image is based on the finding that a minimum error of the ellipse parameters may be achieved when several sets of ellipse points are evaluated. Particularly with an ellipse in which the ratio of the lengths of the semiaxes strongly differs from one, the coordinates of the first ellipse point and of the second ellipse point clearly have a greater or smaller error than the coordinates of the third ellipse point and of the fourth ellipse point, for example. Thus, by the use of several sets of ellipse points for the calculation of the ellipse parameters, it can be achieved that an error remains approximately the same independently of the location of the ellipse. Otherwise, it is pointed out that it has been realized that the use of the first ellipse point and of the second ellipse point is equal to a use of the third ellipse point and of the fourth ellipse point. Concurrent use of all four ellipse points in a calculation of the ellipse parameters is, however, typically not advisable, since this would lead to a redundancy of the equation system. Rather, it has been shown that the multiple use of the ellipse parameters, using five coordinates each, in combination with ensuing averaging, provides sufficiently good results, without having to use a complex optimization method the execution time of which is unknown or may vary.

In a further preferred embodiment, the coordinate determination means is formed to determine two coordinates of the third ellipse point representing a point of the ellipse located furthest in the second direction. The ellipse calculation means preferably is formed to calculate center coordinates of the ellipse from the two coordinates of the first ellipse point and the two coordinates of the second ellipse point. Furthermore, the ellipse calculation means preferably is formed to perform a coordinate transform of the coordinates of the first ellipse point, the second ellipse point and the third ellipse point, in order to obtain transformed coordinates of the first ellipse point, the second ellipse point and the third ellipse point. The coordinate transform preferably is formed to shift a center of the ellipse, which is described by the center coordinates, into a coordinate origin. Thereupon, an estimated transformed second coordinate $y_y$ of the third ellipse point can be calculated using the determination equation $$1 = \frac{y_y}{y_x} \cdot \frac{x_y}{x_x}.$$

Here, $x_x$ is the transformed first coordinate of the first ellipse point, $x_y$ the transformed second coordinate of the first ellipse point, and $x_y$ the transformed first coordinate of the third ellipse point. Then, based on a deviation between the estimated transformed second coordinate $y_y$ and the transformed second coordinate of the third ellipse point directly determined in the coordinate transform, it can be decided whether the third ellipse point used in the calculations mentioned belongs to the ellipse described by the first and second ellipse points. Here, it may for example be evaluated whether an absolute deviation or a relative deviation between the estimated transformed second coordinate of the third ellipse point and the transformed second coordinate of the third ellipse point directly determined in the coordinate transform is greater or smaller than a given threshold. Furthermore, the apparatus for determining information about shape and/or location of an ellipse can be formed to signal if the third ellipse point does not belong to the ellipse passing through the first ellipse point and the second ellipse point. For example, the apparatus thus may output an error message indicating that no ellipse is present in the graphical image to be analyzed, or that several ellipses are present in the graphical image to be analyzed. Thus, it is possible to further improve the reliability of the inventive apparatus for determining information about shape and/or location of an ellipse.

In a further preferred embodiment, the coordinate determination means comprises a pattern recognition means formed to receive a plurality of raster rows to be analyzed and/or raster columns to be analyzed in form of a plurality of parallel signals one after the other, and to forward the received signals in differently quick manner in parallel through a plurality of stages connected one after the other, wherein at least one predetermined stage includes a summing means, which sums signals coming out of the predetermined stage, in order to form a column sum. The pattern recognition means preferably is further formed to evaluate the column sum, in order to determine information about a bent line segment included in the raster row or raster column received from the pattern recognition means, the information including at least one parameter of the bent line segment included in the received raster row or raster column. It has been shown after all that parameters of a curve course included in an image or image excerpt formed by raster rows and/or raster columns can be determined in especially advantageous manner by representing the image or the image excerpt by a plurality of parallel time signals. The time signals here correspond to samples in the image along a raster row or raster column. If several, preferably adjacent, raster rows or raster columns are sampled and thus converted to time signals, the time signals formed describe the image content of the corresponding image excerpt or of the entire image. A line in the image is typically represented by impulses occurring on the individual signals. A bent line in the image (also referred to as bent line segment or bent curve course) is mirrored in the fact that the impulses on the several signals do not occur concurrently but in temporally offset manner, wherein the time instants at which the impulses occur substantially are determined by the curvature of the bent line. If the signals are now forwarded at different speeds in parallel through a plurality of stages connected one after the other, thereby the time offset of the individual signals may be balanced successively or step by step. This means that in a certain stage various signals, which are associated with a curved line in the image, arrive approximately at the same time then. Concurrent arrival of several signals in a stage may be detected by the summing stage belonging to the particular stage, because it preferably sums the signals coming out of the particular stage. If several signals are present in one stage (e.g. in the particular stage, that is) at the same time, the summation result becomes especially large. Thus, based on the summation result, information about a bent line segment included in the raster rows and/or raster columns received from the pattern recognition means can be derived. The time instant at which an especially large column sum occurs carries information about a location parameter of the bent line segment. The stage in which an especially large summation result occurs typically gives an indication on the shape, e.g. the curvature, of the bent line segment.

Furthermore, it is pointed out that a described parallel processing of signals, which describe a raster row or raster column of the graphical image by their temporal course, represents an especially efficient possibility for recognition of bent curves. The pattern recognition means described may be realized in parallel in hardware. With the aid of the pattern recognition means described, the entire graphical image or image excerpt from the graphical image may be examined, wherein the presence of a bent line segment can be recognized.

In a further preferred embodiment, the predetermined stage further comprises a threshold value recognition means formed to receive the column sum of a predetermined stage and to recognize if at least a predetermined number of signals in the predetermined stage are active at the same time. Here, the pattern recognition means further is preferably formed to evaluate the output signal of the threshold value recognition means, in order to determine the information about the bent line segment included in the raster row or raster column received from the pattern recognition means.

It is pointed out that the pattern recognition means preferably comprises a plurality of stages and of summing means and/or threshold value recognition means belonging to the stages, each evaluating signals at the input and/or output of the stages of the pattern recognition means, by which the signals are forwarded in parallel. With this, differently bent line segments may then be recognized, wherein the shape of the bend or the radius of curvature of the bent line segments can be derived from the fact at the output of which stage a maximum column sum occurs.

Furthermore, it is preferred that the pattern recognition means is formed to temporally distort a curved curve course and/or a bent line segment, which is described by the signals received from the pattern recognition means, step by step when passing through the stages connected one after the other, due to a differently quick propagation of the signals, in order to obtain a temporally distorted description of the curved curve course, and in order to recognize when an approximately straight line, which is represented by a plurality or by a given minimum number of concurrently active signals in a particular stage, is described by the distorted description.

Furthermore, it is preferred that at least one stage of the pattern recognition means is formed to delay several signals in differently strong manner when forwarding same through the stage. By the introduction of different delays in the individual stages, it may be achieved that the signals can be forwarded in differently quick manner in parallel through a plurality of stages connected one after the other. One stage may for example be formed to apply exactly one of two possible delays to each signal, wherein one of the delays may be determined by a minimum runtime possible through the stage. In other words, the stage may be formed to forward a signal with minimum delay possible or to turn on a defined delay. Of course, however, it is also possible that a stage is formed to apply three or more possible delays to several signals. Otherwise, a stage may be hardwired for a particular delay, or the stage may be adjusted to a desired delay during the operation. Furthermore, it is to be pointed out that, by the use of different delays, differently quick propagation of the several signals can be achieved in advantageous manner.

In a further preferred embodiment, the pattern recognition means may thus be formed, by setting different delays in the forwarding of the signals through the stage, so that a circularly bent line segment included in the raster rows or raster columns received from the pattern recognition means and represented by the signals going into pattern recognition means is deformed to approximately a straight line after passing through a number of stages. Here, the pattern recognition means is preferably formed to recognize the presence of the straight line and to establish, after passing through how many stages the straight line is present. Here, the pattern recognition means further is preferably formed to derive at least one parameter of the circularly bent line segment received from the pattern recognition means, for example a location parameter or information about the radius of curvature of the circularly bent line segment, from the time instant at which a presence of a straight line is recognized, and/or from the number of passed stages, after passing of which a presence of a straight line is recognized. The adjustment of the delay of the signals in a stage does indeed enable the inventive pattern recognition means to recognize circularly bent line segments. However, it is to be pointed out here that the pattern recognition means is preferably formed to evaluate only the location of the recognized circularly bent line segment.

Furthermore, it is preferred that the coordinate determination means is formed to supply the image to the pattern recognition means twice in form of successively transmitted raster rows to be analyzed. Here, the coordinate determination means preferably is formed to supply the image to the pattern recognition means for a determination of the two coordinates of the first ellipse point, beginning with a raster row of the image located at a first edge of the image, and to supply the image to the raster recognition means for a determination of the two coordinates of the second ellipse point, beginning with a raster row located at the second edge of the image, wherein the second edge of the image is opposite to the first edge of the image. The pattern recognition means preferably is designed to recognize only bent line segments of a given direction of curvature. If an image or an image excerpt is supplied to the pattern recognition in two directions, the coordinate determination means can recognize parameters of curved line segments with the first direction of curvature and of curved line segments with an opposite second direction of curvature, even if the pattern recognition means is only formed to recognize bent line segments with the first direction of curvature. Thus, by the double supply of an image or image excerpt to the same pattern recognition means in different directions, it can be refrained from configuring the pattern recognition means for a recognition of bent line segments with both possible directions of curvature. After all, it has been shown that a pattern recognition means capable of identifying line segments with a curvature both in the first direction of curvature and in the second direction of curvature is substantially more expensive than a pattern recognition means only capable of recognizing line segments with a first direction of curvature. With this, the described measure enables to reduce the complexity of the inventive apparatus, wherein at the same time the performance is not reduced significantly.

In another embodiment it is preferred that the coordinate determination means includes a first pattern recognition means and a second pattern recognition means, wherein the first pattern recognition means is formed to recognize bent line segments with a first given direction of curvature, and wherein the second pattern recognition means is formed to recognize bent line segments with a second direction of curvature opposite to the first given direction of curvature. The coordinate determination means preferably is formed to supply the image to the first pattern recognition means for a determination of the two coordinates of the first ellipse point, beginning with a raster row located at the first edge of the image, and to supply the image to the second pattern recognition means for a determination of the two coordinates of the second ellipse point, also beginning with a raster row located at the first edge of the image. In other words, if a particularly high recognition speed in the ellipse recognition is required, bent line segments can be processed with both possible directions of curvature in parallel, in order to determine the coordinates of the first ellipse point and of the second ellipse point. Hereby, on the one hand, the speed of the recognition can be increased, and the structure of the inventive means simplifies as opposed to the previously described embodiment, on the other hand, since the image is read out each beginning with a raster row located at the first edge of the image. For this reason, no means has to be provided to supply the image to the pattern recognition means starting with a raster row located at the second edge of the image. Such a supply, which is capable of processing the image in two directions, might entail increased effort regarding a design of a memory access controller.

Furthermore, it is preferred that the first direction is orthogonal to the second direction. With this, the first direction and the second direction form a Cartesian coordinate system, which is particularly well suited for an execution of computations. A distortion of the ellipse is not given then. Otherwise, it is pointed out that raster images also typically have raster rows and raster columns perpendicular to each other. Thus, the first direction and the second direction may coincide with the preferred directions of the raster image, which are defined by the raster rows and raster columns.

Furthermore, it is preferred that the apparatus for determining information about shape and/or location of an ellipse is formed to derive the graphical image from video date of a video data source, for example a camera, a video media player, a terrestrial or satellite-aided video data receiver or a computer. After all, it has been shown that the recognition of an ellipse and/or the determination of the accompanying ellipse parameters can be used especially advantageously in connection with video data, in order to understand dynamic technical processes.

Furthermore, the inventive apparatus may include a data interface formed to output the information about the shape and/or the location of the ellipse. The information about the shape and/or the location of the ellipse may, however, also be illustrated by a display device. Output and/or display may here take place in analog and/or digital form each. Here, an electrical or optical interface is preferred, which makes the data available for further processing, using a serial or parallel interface protocol. A bus interface, which is suitable for the attachment of several electrical appliances, may also be used. As display device, for example, an LED display, an LCD display or a screen may be used.

Furthermore, the apparatus for determining information about shape and/or the location of the ellipse may be formed to preprocess the graphical image by threshold value binarization, in which a light value or a dark value is associated with each image point of the graphical image, depending on a result of a comparison of a color value of the image point in question and/or brightness of the image point in question, in order to obtain a binarized image. Preprocessing may further be formed to apply edge detection to the binarized image, wherein the edge detection is preferably formed to produce an edge image in which edge-shaped transitions in the binarized image from the light value to the dark value are characterized as a line-shaped edge. The coordinate determination means is further preferably formed to process the edge image. After all, it has been shown that edge images can be processed extremely well by the inventive apparatus, because the inventive apparatus is formed to evaluate bent line segments. The bent line segments evaluated by the inventive apparatus, however, preferably describe the outline of an ellipse, even if the ellipse appears as a solid object in the graphical image. Furthermore, it is pointed out that the inventive pattern recognition means also is particularly well suited for processing an edge image.

So as to be able to extract the edges in better way, the graphical image, which typically is present as a color image or gray-scale image, preferably is at first supplied to the threshold value binarization, whereby the graphical image is converted to a binarized image or a black and white image. In a black and white image, edge recognition can be performed with less effort than in a color image, since in a black and white image harsh transitions between a light value (white) and a dark value (black) exist, which may thus be recognized as edges.

Furthermore, it is preferred that the inventive apparatus is formed to receive the graphical image from a camera arranged to sense a pupil of the human eye, the information about the shape and/or location of the ellipse in the graphical image here representing information about shape and/or position of the pupil of the human eye. With this, the position of the pupil may thus be detected, from which a viewing direction of the human eye can be deduced. The viewing direction of the human may then be used for the control of further devices, such as devices in medical technology.

In a further preferred embodiment, the inventive apparatus comprises an interface formed to establish communication with a positioning means, wherein the positioning means is formed to cause mechanical motion depending on the shape and/or the location of an ellipse in the graphical image. Thus, the inventive apparatus may be used to control a mechanical positioning means.

The present invention further includes a method and a computer program for determining information about shape and/or location of an ellipse.

Preferred embodiments of the present invention will be explained in greater detail in the following with reference to the accompanying drawings, in which:

FIG. 2a is a graphical illustration of an ellipse as well as the coordinates of a first ellipse point, a second ellipse point, a third ellipse point, a fourth ellipse point as well as a center of the ellipse;

FIG. 2b is graphical illustration of an ellipse shifted into the origin as well as of transformed coordinates of two ellipse points;

Figure 14:
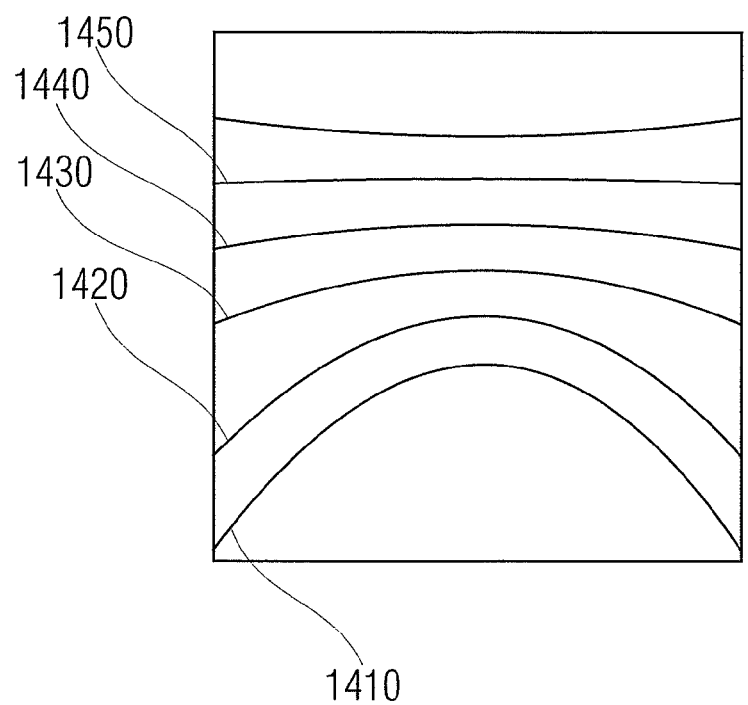
Figure 15:
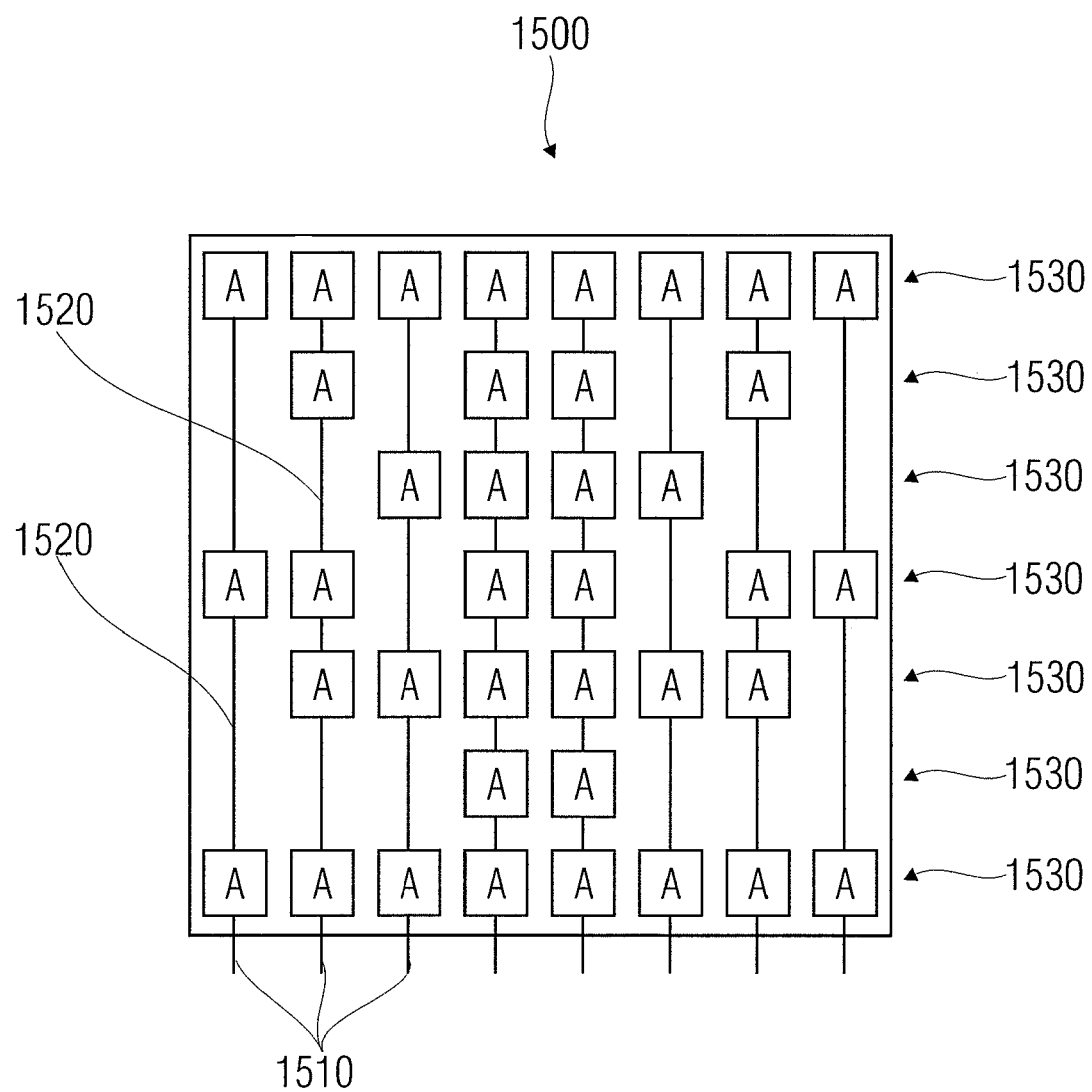
Figure 16A:
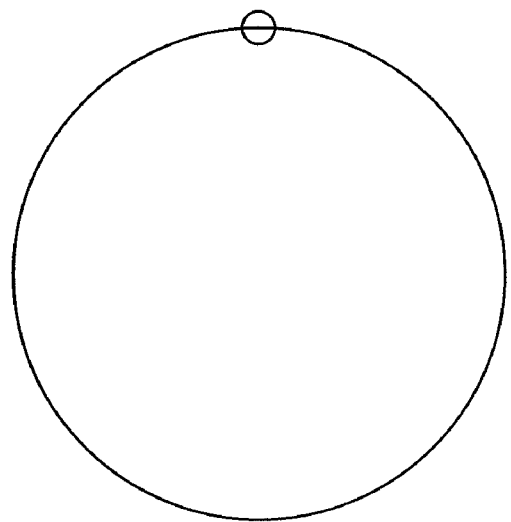
Figure 16B:
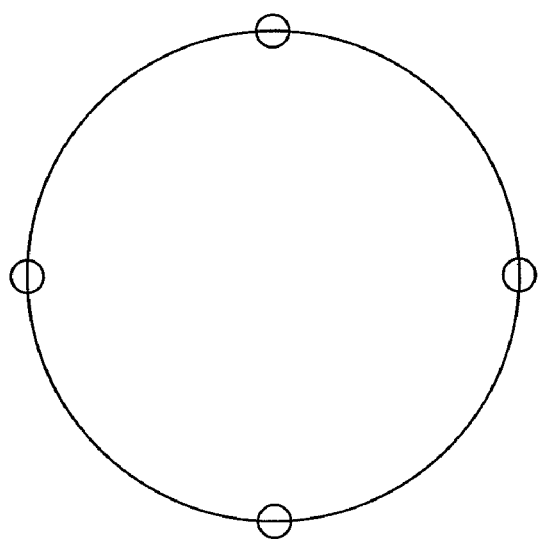
Figure 17:
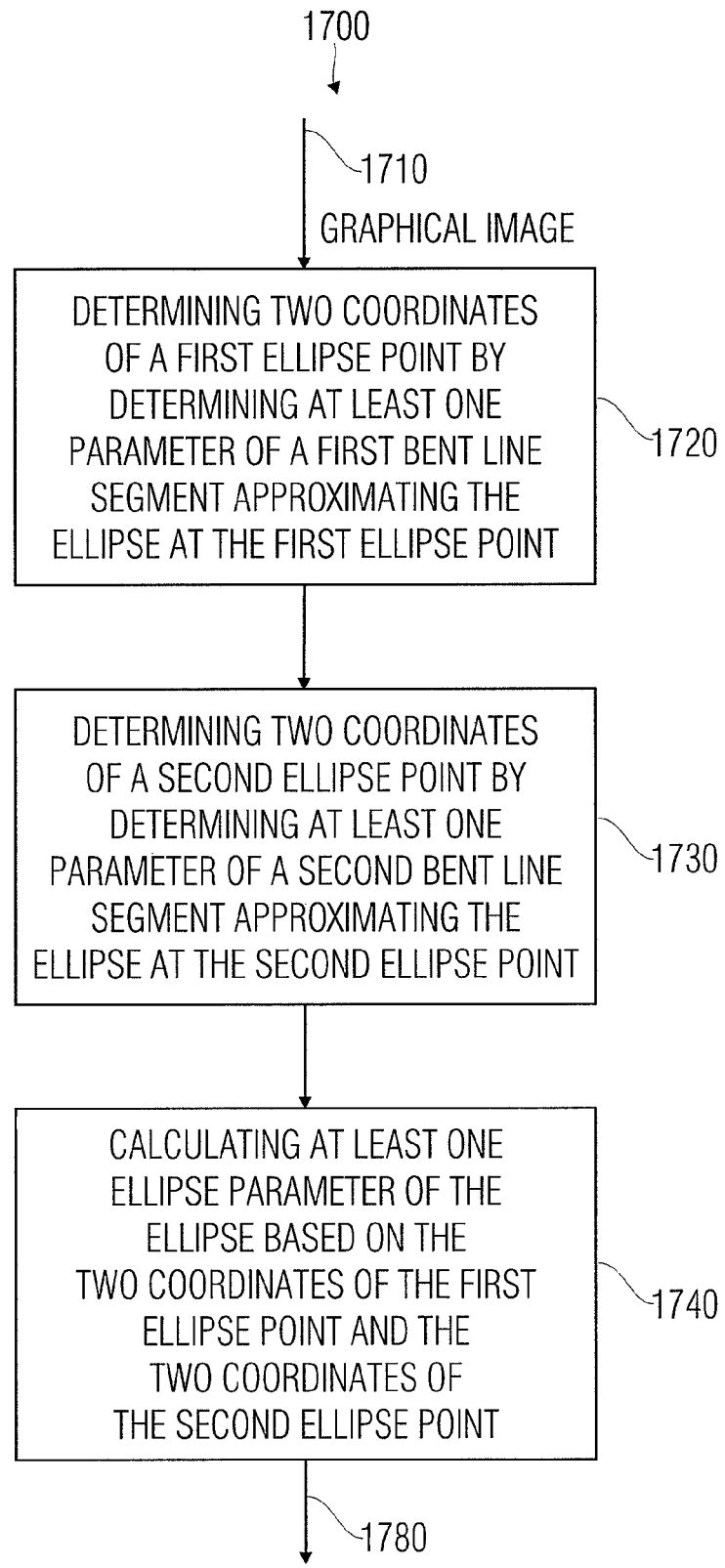

FIG. 14 a graphical illustration of curve courses resulting when passing through an inventive Hough transform means;

FIG. 15 is a schematic illustration of an exemplary structure of an inventive Hough transform means;

FIG. 16a is a graphical illustration of an image of a circle with a recognized extreme point, processed by an inventive Hough transform means;

FIG. 16b is a graphical illustration of an image of a circle with four recognized extreme points, processed by an inventive Hough transform means; and FIG. 17 is a flow chart of an inventive method for determining information about shape and/or location of an ellipse in a graphical image.

Figure 1:
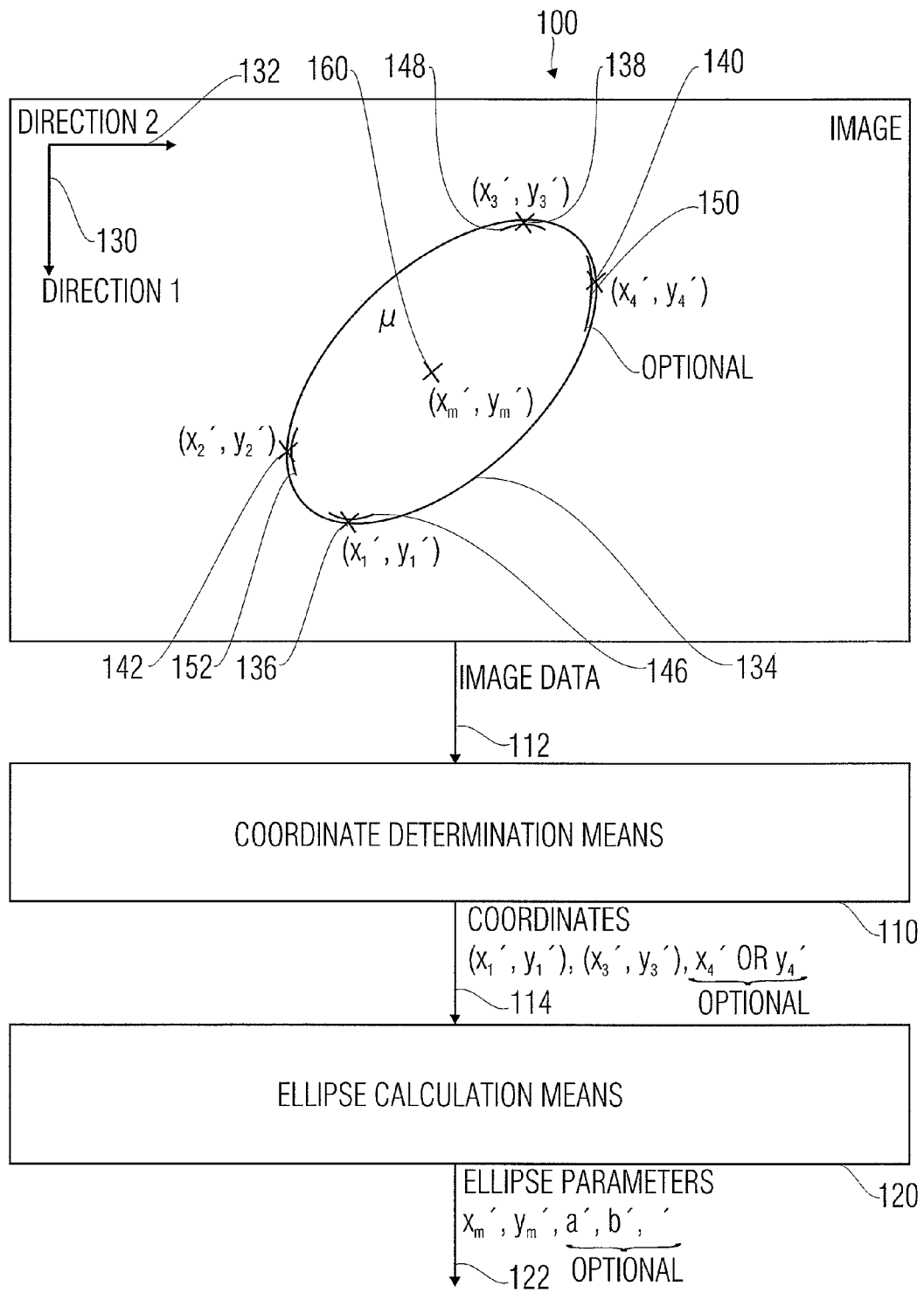
FIG. 1 is a block circuit diagram of an inventive apparatus for determining information about shape and/or location of an ellipse in a graphical image, according to the first embodiment of the present invention.

FIG. 1 shows a block circuit diagram of an inventive apparatus for determining information about shape and/or location of an ellipse in a graphical image, according to a first embodiment of the present invention. The block circuit diagram of FIG. 1 is designated with 100 in its entirety. The inventive apparatus 100 substantially includes a coordinate determination means 110 formed to receive image data 112. The coordinate determination means 110 is formed to extract coordinates 114 of labeled ellipse points of an ellipse included in the image data 112 and then make this coordinate data 114 available to an ellipse calculation means 120. The ellipse calculation means 120 is formed to calculate ellipse parameters 122 from the coordinates 114 supplied from the coordinate determination means 110, and to output the ellipse parameters 122 for further processing.

Based on the above structural description, the functioning of the inventive apparatus will be explained in greater detail in the following. Here, it is assumed that the image data 112, which describes a graphical image, contain an ellipse. Furthermore, it is assumed that a first direction 130 as well as a second direction 132 are defined in the image data 112. An ellipse 134 included in the image data 112 comprises a first ellipse point 136 with associated coordinates $(x_1', y_1')$, wherein the first ellipse point 136 represents the ellipse point located furthest in the first direction. Here, the location is defined by a rectangular or oblique coordinate system, for example, which comprises the first direction 130 and the second direction 132 as preferred directions or as coordinate axes. Furthermore, the ellipse 134 comprises a second ellipse point 138 with associated coordinates $(x_3', y_3')$, which represents a point of the ellipse located furthest in a direction opposite to the first direction 130. Furthermore, the ellipse comprises a third ellipse point 140 with associated coordinates $(x_4', y_4')$, which represents a point of the ellipse located furthest in the second direction 132. Finally, the ellipse 134 also comprises a fourth ellipse point 142 with associated coordinates $(x_2', y_2')$, which represents a point of the ellipse located furthest in a direction opposite to the second direction 132.

Furthermore, it is pointed out that the ellipse 134 may be approximated by bent line segments 146, 148, 150, 152 at the four previously described labeled ellipse points 136, 138, 140, 142. The bent line segments 146, 148, 150, 152 may each be described by a plurality of parameters. For example, the first line segment 146 may be described by two scalar location parameters, for example an x coordinate and a y coordinate, and a curvature parameter, for example a radius of curvature. Furthermore, the first line segment 146 may for example touch the ellipse in the first ellipse point 136. However, it is also possible that the first line segment 136 intersects the ellipse 134 at the first ellipse point 136, wherein the ellipse 134 and the first bent line segment 146, however, preferably comprise a common tangent at the first ellipse point 136. The common tangent may here be given by a line of such a nature that its points comprise a constant coordinate in the first direction. This corresponds to the definition of the first ellipse point as the point of the ellipse located furthest in the first direction. Furthermore, it is pointed out that the first line segment 146 preferably belongs to a family of parameterized bent line segments, wherein the parameters for example describe the location and/or the curvature of the individual line segments of the family.

The parameters of the first line segment, i.e. the location and/or curvature of the first line segment 146, thus are closely connected to the location and/or the shape of the ellipse 134.

In summary, it is pointed to the fact that a line segment is regarded as the first line segment 146 approximating the ellipse 134 at the first ellipse point 136, when it is sufficiently similar to the ellipse in a surrounding of the first ellipse point with reference to a distance measure. In addition, it may be required that further criteria are met, i.e. for example that a line segment is only identified as the first line segment 136 if it has a common tangent with the line of the ellipse 134 at the first ellipse point 136.

The second bent line segment 148, the third bent line segment 150 and the fourth bent line segment 152 are defined in analog manner, wherein the second bent line segment 148 is a bent line segment approximating the ellipse at the second ellipse point 138, wherein the third bent line segment 140 is a bent line segment approximating the ellipse at the third ellipse point 150, and wherein the fourth bent line segment is a bent line segment approximating the ellipse at the fourth ellipse point 142.

The coordinate determination means 110 also is formed to determine at least one parameter of the first bent line segment 146 and to determine the coordinates $(x_1', y_1')$ of the first ellipse point 136 based on the at least one determined parameter of the first bent line segment 146. Furthermore, the coordinate determination means 110 also is formed to determine at least one parameter of the second bent line segment 148 and to determine the coordinates $(x_3', y_3')$ of the second ellipse point 138 based on the at least one parameter of the second bent line segment 148.

For example, if the first bent line segment 146 belongs to a parameterized family of bent line segments, the determination of the parameters of the first bent line segment corresponds to identifying a bent line segment from the family of bent line segments that approximates the ellipse 134 and the first ellipse point 136 sufficiently well and/or as well as possible. The quality of the approximation may here, for example, be determined by a mathematical distance measure, and a threshold value for the distance measure may be set, wherein upon exceeding or falling below the threshold value it is assumed that a bent line segment from the parameterized family of bent line segments approximates the ellipse 134 at the first ellipse point 136 sufficiently well.

In comparable manner, the coordinate determination means 110 may determine the parameters of the second bent line segment 148 approximating the ellipse 134 in a surrounding of the second ellipse point 138. A parameterized family of bent line segments, which is used in the determination of the parameters of the second bent line segment 138, for example, may here be equal to the parameterized family of line segments used for a determination of the parameters of the first bent line segment 146 or may differ therefrom, for example with respect to the direction of curvature.

When the coordinate determination means 110 has determined the at least one parameter of the first bent line segment 146 and the at least one parameter of the second bent line segment 148, the coordinate determination means 110 may derive the coordinates $(x_1', y_1')$ of the first ellipse point 136 as well as the coordinates $(x_3', y_3')$ of the second ellipse point 138 therefrom. The coordinate determination means 110 then forwards the coordinates $(x_1', y_1')$ of the first ellipse point 136 as well as the coordinates $(x_3', y_3')$ of the second ellipse point 138 to the ellipse calculation means 120.

The ellipse calculation means 120 may then calculate at least the center coordinates $(x_m', y_m')$ of the ellipse 134 based on the coordinates $(x_1', y_1')$ of the first ellipse point 136 and the coordinates $(x_3', y_3')$ of the second ellipse point 138. Thus, a center 160 of the ellipse 134 is known.

The coordinate determination means 110 may also preferably be formed to further determine at least one parameter of the third bent line segment 150 approximating the ellipse at the third ellipse point 140. Here, it may again be determined which bent line segment from a family of bent line segments best approximates the ellipse 134 at the third ellipse point 140. The accompanying family parameter then for example again represents the parameter of the identified third line segment 150 and may be used by the coordinate determination means to determine at least one coordinate $x_4$ or $y_4$ of the third ellipse point 140. The coordinate determination means 110 may then pass this coordinate $x_4$ or $y_4$ on to the ellipse calculation means 120, whereby the ellipse calculation means 120 is enabled to determine and/or calculate all parameters of the ellipse, that is the two coordinates $(x_m', y_m')$ of the ellipse center 160, the lengths a', b' of the two semiaxes of the ellipse 134, as well as a rotational angle $\alpha'$, using analytical formulae, in connection with the coordinates $(x_1', y_1')$ and $(x_3', y_3')$ of the first ellipse point 136 and the second ellipse point 138.

Once again, it is to be pointed out explicitly here that, for the determination of the parameters of the first line segment 146, a-priori knowledge about the shape of the first line segment 146 may be used. After all, it is known beforehand that the first line segment 146 must approximate the ellipse 134 at the first ellipse point 136, i.e. that the first line segment 146 must have the same curvature property or at least the same direction of curvature the ellipse 134 has at the first ellipse point 136. Furthermore, the first line segment 146 preferably is defined by the fact that it is tangent to the ellipse at the first ellipse point 136 or at least has a common tangent with the ellipse 134 at the first ellipse point 136. Hence, the coordinate determination means generally is preferably formed to identify, in the graphical image, a curve course satisfying the above-mentioned conditions (curvature property, tangent direction) as the first bent line segment. The use of a parameterized family of curves only is to be seen as an example here, but all pattern recognition algorithms capable of identifying parameters of a bent line segment with given direction of curvature and given tangent direction and of describing the same by at least one location parameter may rather be used.

Analog definitions also apply to the second bent line segment 148, the third bent line segment 150 and the fourth bent line segment optionally used in addition. Corresponding algorithms, such as for the identification of the first bent line segment, may be used, wherein the algorithms only have to be adapted with reference to the direction of curvature and the tangent direction.

A substantial advantage of the inventive apparatus for determining information about shape and/or location of an ellipse is that "extreme points" of the ellipse to be identified, that is points of the ellipse located furthest in several given directions, are determined. The first ellipse point 136, the second ellipse point 138, the third ellipse point 140 and the fourth ellipse point 143 may be regarded as extreme points according to the above definition. Here, the extreme points are determined by identifying a bent line segment approximating the ellipse at the respective extreme point. Here, the a-priori knowledge about the curvature of the ellipse at the respective extreme point may be used, as well as further a-priori knowledge about a direction of a tangent to the ellipse at the respective extreme point. Thus, preferably not arbitrary image points of the graphical image or the image data 112 are used for the determination of the extreme points, but only such image points representing a bent line (or a bent line segment) capable of approximating an ellipse at the respective rotation point.

Through the a-priori knowledge, i.e. through knowledge about the curvature of such a bent line segment and the direction of the tangent of such a bent line segment at the point at which it touches the ellipse 134 (or has at least a common tangent with the ellipse), a suitable bent line segment approximating the ellipse 134 at one of the extreme points may here be found in very efficient way. Once two opposite extreme points of the ellipse, i.e. for example the first ellipse point 136 and the second ellipse point 138, are known, at least the center 160 of the ellipse may be determined in computationally very efficient manner in a second step by the ellipse computation means 120.

Furthermore, only the determination of two coordinates $(x_1', y_1')$ of the first ellipse point 136, of two coordinates $(x_3', y_3')$ of the second ellipse point 138 and of only one coordinate $(x_4', y_4')$ of the third ellipse point 140 is sufficient to calculate all ellipse parameters $(x_m', y_m')$, a', b', α'.

So as to facilitate understanding of the following explanations, the employed definitions of the ellipse parameters will be illustrated in the following. FIG. 2a thus shown a graphical illustration of an ellipse as well as the coordinates of a first ellipse point, a second ellipse point, a third ellipse point, a fourth ellipse point and a center of the ellipse. The graphical illustration of FIG. 2a is designated with 200 in its entirety. The graphical illustration 200 shows a Cartesian coordinate system with an x axis 210 as well as a y axis 212, the x axis 210 and the y axis 212 being perpendicular to each other. In the coordinate system formed by the x axis 210 and the y axis 212, an ellipse 220 is arranged. The ellipse 220 has a first ellipse point 226 with accompanying coordinates $(x_3', y_3')$. The first ellipse point 226 here represents the point of the ellipse 220 located furthest in the x direction defined by the x axis 210. A further ellipse point 228 with accompanying coordinates $(x_1', y_1')$ forms the point of the ellipse 220 located furthest in negative x direction. A third ellipse point 230 with accompanying coordinates $(x_2', y_2')$ further represents the point of the ellipse 220 located furthest in the y direction defined by the y axis 212, and a fourth point 232 with accompanying coordinates $(x_0', y_0')$ forms a point of the ellipse 220 located furthest in negative y direction. A center 240 of the ellipse further has center coordinates $(x_m', y_m')$. The graphical illustration 200 further shows a first semiaxis 242 of the ellipse, which represents the large semiaxis of the ellipse in the case shown and the length of which is described by the parameter a. A second semiaxis 244 of the ellipse 220 forms a small semiaxis of the ellipse 220 in the case shown. The length of the second semiaxis 244 of the ellipse is described by the parameter b.

Furthermore, 2b shows a graphical illustration of an ellipse shifted to the origin, together with transformed coordinates of characteristic ellipse points. The graphical illustration of FIG. 2b is designated with 250 in its entirety. The graphical illustration 250 again shows an x axis 260 as well as a y axis 262, which orthogonally intersect at an origin 264. The graphical illustration 250 further shows an ellipse 270 shifted to the origin, the center 272 of which coincides with the origin 264. Furthermore, a transformed first ellipse point 276 is shown with accompanying coordinates $(x_x, y_x)$. The transformed first ellipse point 276 again forms the point of the ellipse 270 located furthest in the x direction defined by the x axis 260. Otherwise, it is pointed to the fact that the transformed first ellipse point 276 results from the first ellipse point 226 by a shift, wherein:

$$x_x = x_3 - x_m; y_x = y_3 - y_m.$$

applies.

The graphical illustration 250 further has a transformed third ellipse point 280 with accompanying coordinates $(x_y, y_y)$. The transformed third ellipse point 280 forms a point of the ellipse 270 located furthest in the y direction determined by the y axis 262. The transformed third ellipse point 280 further results from the third ellipse point 230 by a shift, wherein:

$$x_y = x_2 - x_m; y_y = y_2 - y_m.$$

applies.

The graphical illustration 250 further shows a first semiaxis 292 of the ellipse 270, which represents a large semiaxis in the shown example and the length of which is designated with a, as well as a second semiaxis 294 of the ellipse 270, which represents a small semiaxis in the example shown and the length of which again is designated with b. Furthermore, a rotational angle α is shown. The rotational angle α is shown here as an acute angle between the x axis 260 and the second semiaxis 294 of the ellipse 270.

The graphical illustration 250 thus shows transformed extreme points 276, 280 of the ellipse 270 shifted (i.e. transformed) to the origin, as well as accompanying ellipse parameters a, b and α.

Figure 3:
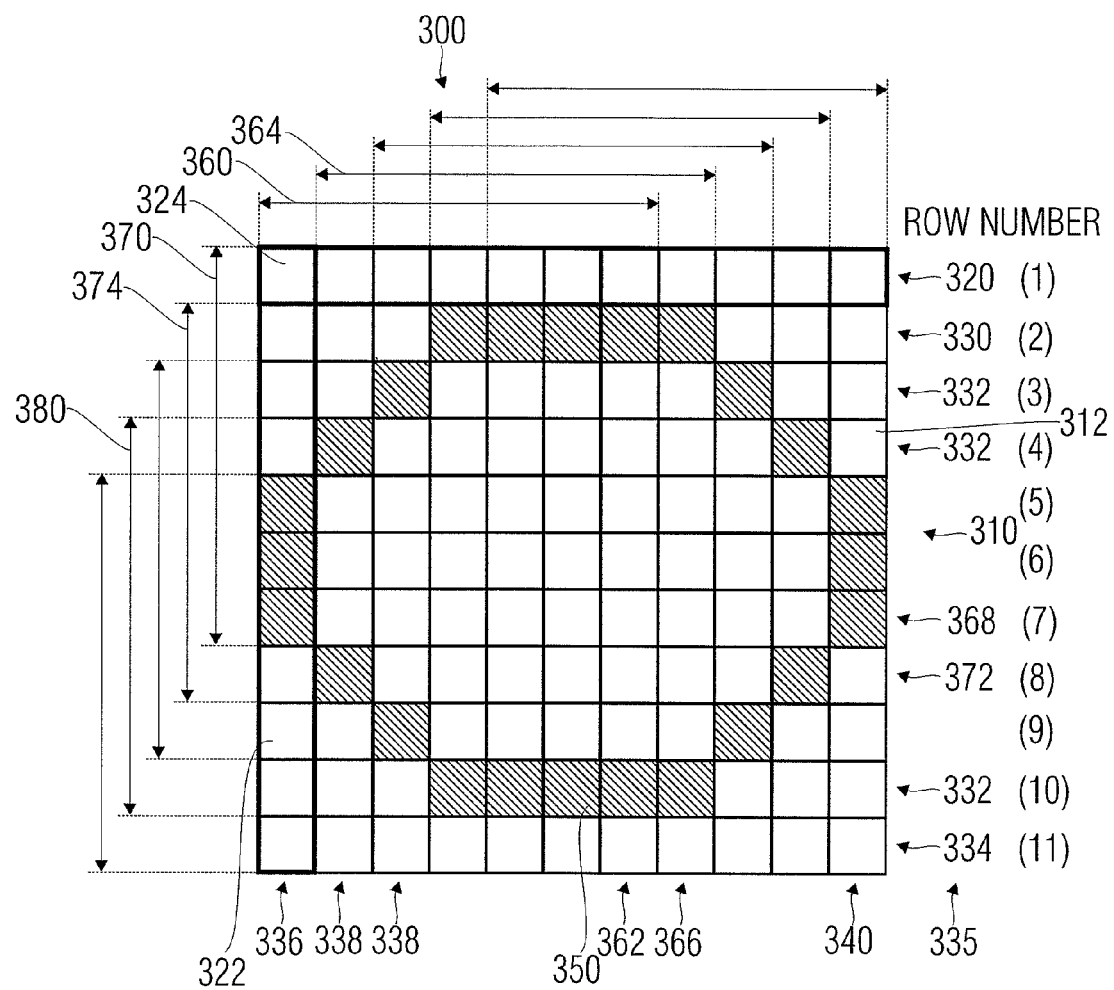
FIG. 3 is a graphical illustration of an exemplary raster image as well as of successively processed image excerpts.
Figure 3:
Figure 3:

FIG. 3 shows a graphical illustration of an exemplary raster image of an ellipse. The graphical illustration of FIG. 3 is designated with 300 in its entirety. Here, a raster image 310 with a plurality of raster points 312 is shown. A raster point may here be inactive or white, as shown at the raster point 312. A raster point may further be active or black, as it is for example indicated by hatching at the raster point 314. Furthermore, it is pointed out that the raster image 310 includes a plurality of raster rows as well as a plurality of raster columns.

Here, a raster row combines a plurality of raster points, as it is for example illustrated by the thick outlined area 320 describing a raster row. A raster column also describes a combination of several raster points. An example for a raster column is shown by the thick outlined area 322 representing a raster column. Raster rows and raster columns preferably are orthogonal to each other here. Furthermore, it is pointed out that raster rows and raster columns may of course overlap. For example, the raster row 320 and the raster column 322 have a common image point, which is designated with 324. Furthermore, it is pointed out that an image or image excerpt may be described completely both by a plurality of raster rows and by a plurality of raster columns, because every rastered area can be described both by raster rows and raster columns. Furthermore, it is pointed out that the raster image 310 comprises, by definition, a first raster row, the raster row 320, a second raster row 330, several further raster rows 332, which preferably are numbered successively, as well as a last raster row 334. Corresponding row numbers are designated with 335. Similarly, the raster image 310 comprises a first raster column 322, a second raster column 336, further raster columns 338, which preferably are numbered successively, as well as a last raster column 340.

The graphical illustration 300 further shows an ellipse 350, which is represented by the raster image 310 in form of active or black raster points (or image points), wherein the active raster points are characterized by hatching.

The graphical illustration 300 further shows a first group of raster columns designated with 360. The first group of raster columns includes the first raster column 322, the second raster column 336 as well as all following raster columns inclusive of the seventh raster column 362. The first group 360 of raster columns thus describes an excerpt from the raster image 310.

The excerpt mentioned from the raster image further includes a plurality of raster rows, which are shortened as opposed to the original raster rows by the limitation of the number of columns. The shortened raster rows, which may result from the selection of an image excerpt, also will be referred to as raster rows in short in the following.

The second group of raster columns, which is designated with 364, further includes the second raster column 336 as well as the following raster columns up to an eighth raster column 366. In other words, seven adjacent raster columns each are combined to a group of raster columns intended for common processing.

A similar grouping can be done for the raster rows, wherein the first raster row 320, the second raster row 330 as well as all following raster rows up to the seventh raster row 368 are combined to a first group 370 of raster rows, for example. Similarly, a second group of raster rows includes the second raster row 330 up to the eighth raster row 372, wherein the second group of raster rows is designated with 374.

Of course, it is to be pointed out here that a group of raster rows may include any number of raster rows, for example five raster rows, 16 raster rows, 32 raster rows or 64 raster rows. Here, it is only preferred that the number of raster rows combined to a group of raster rows is greater than 2. Analog considerations also apply to a group of raster columns.

Figure 4A:
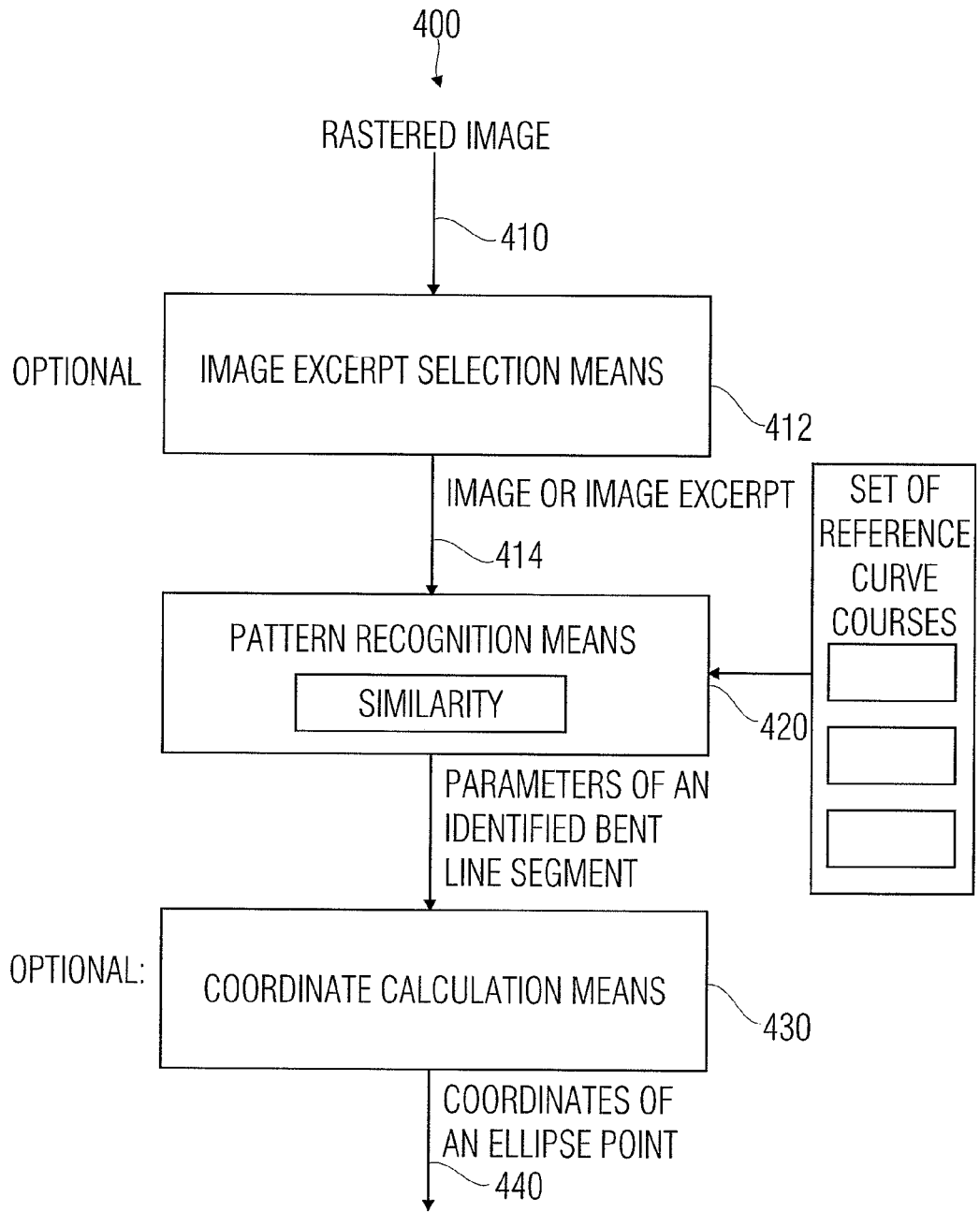
FIG. 4a is a block circuit diagram of an inventive apparatus for determining coordinates of an ellipse point according to a second embodiment of the present invention.

FIG. 4a shows a block circuit diagram of an inventive apparatus for determining coordinates of an ellipse point in a graphical image, according to a second embodiment of the present invention. The apparatus according to FIG. 4a is designated with 400 in its entirety. The apparatus 400 is particularly well suited to process a raster image 310, as it is shown in FIG. 3, as it will be explained in the following.

The apparatus 400 is formed to receive a rastered image 410. Furthermore, the apparatus 400 optionally is formed to select an image excerpt 414 from the rastered image 410 with the aid of an optional image excerpt selection means 412. A selected image excerpt 414 may for example be defined by a plurality of raster rows and/or a plurality of raster columns, for example by a group of raster rows or a group of raster columns, as described with reference to FIG. 3. The inventive apparatus 400 further includes a pattern recognition means 420 formed to receive the rastered image or the rastered image excerpt 414. Furthermore, the pattern recognition means 420 is formed to determine whether a curve course or a bent line segment from a set of reference curve courses is included in the rastered image or image excerpt 414.

The curve courses of the set of reference curve courses may here be filed in a memory for a determination of the similarity between curve courses included in the rastered image or image excerpt 414 and the reference curve courses, for example. Likewise, it is also possible, however, that the structure of the pattern recognition means is formed to recognize whether a curve course sufficiently similar to a reference curve course from the set of reference curve courses is included in the rastered image or image excerpt 414. As reference curve courses, here preferably such curve courses approximating an ellipse at the first ellipse point, the second ellipse point, the third ellipse point or the fourth ellipse point are used. Thus, the pattern recognition means hence is generally formed to recognize whether a curve course approximating an ellipse at the first ellipse point, at the second ellipse point, at the third ellipse point or at the fourth ellipse point is included in the rastered image or image excerpt 414.

Furthermore, the pattern recognition means 420 is preferably formed to identify a curve course from the set of reference curve courses that is sufficiently similar to a curve course included in the rastered image or image excerpt 414 as the first bent line segment, the second bent line segment, the third bent line segment or the fourth bent line segment, depending on at which one of the first ellipse point, the second ellipse point, the third ellipse point or the fourth ellipse point the reference curve course from the set of reference curve courses approximates the ellipse.

Furthermore, the pattern recognition means 420 is formed to determine at least one location parameter, but preferably two location parameters, such as optionally a further parameter describing a curve shape of the first line segment, the second line segment, the third line segment or the fourth line segment. From the location of the identified first bent line segment, the second bent line segment, the third bent line segment or the fourth bent line segment, an optional coordinate calculation means 430 may then calculate the coordinates of the first ellipse point, the second ellipse point and the third ellipse point or the fourth ellipse point. The coordinate calculation means 430 may, however, be omitted if the location parameters of the bent line segments determined by the pattern recognition means 420 are already defined such that the location parameters directly indicate coordinates of the first ellipse point, the second ellipse point and the third ellipse point or the fourth ellipse point, at which the bent line segments preferably pass through the labeled ellipse points.

Furthermore, it is to be pointed out here that preferably such curve courses approximating an ellipse at the first ellipse point, at the second ellipse point, the third ellipse point or the fourth ellipse point (or in a surrounding of the respective ellipse points) are used as reference curve courses. Preferably, symmetrical bent curve courses are used as reference curve courses. Otherwise, it is preferred to use excerpts from circular curves, for example, as reference curve courses, because circular curves approximate an ellipse particularly well at the first ellipse point, at the second ellipse point, at the third ellipse point or at the fourth ellipse point.

Figure 4B:
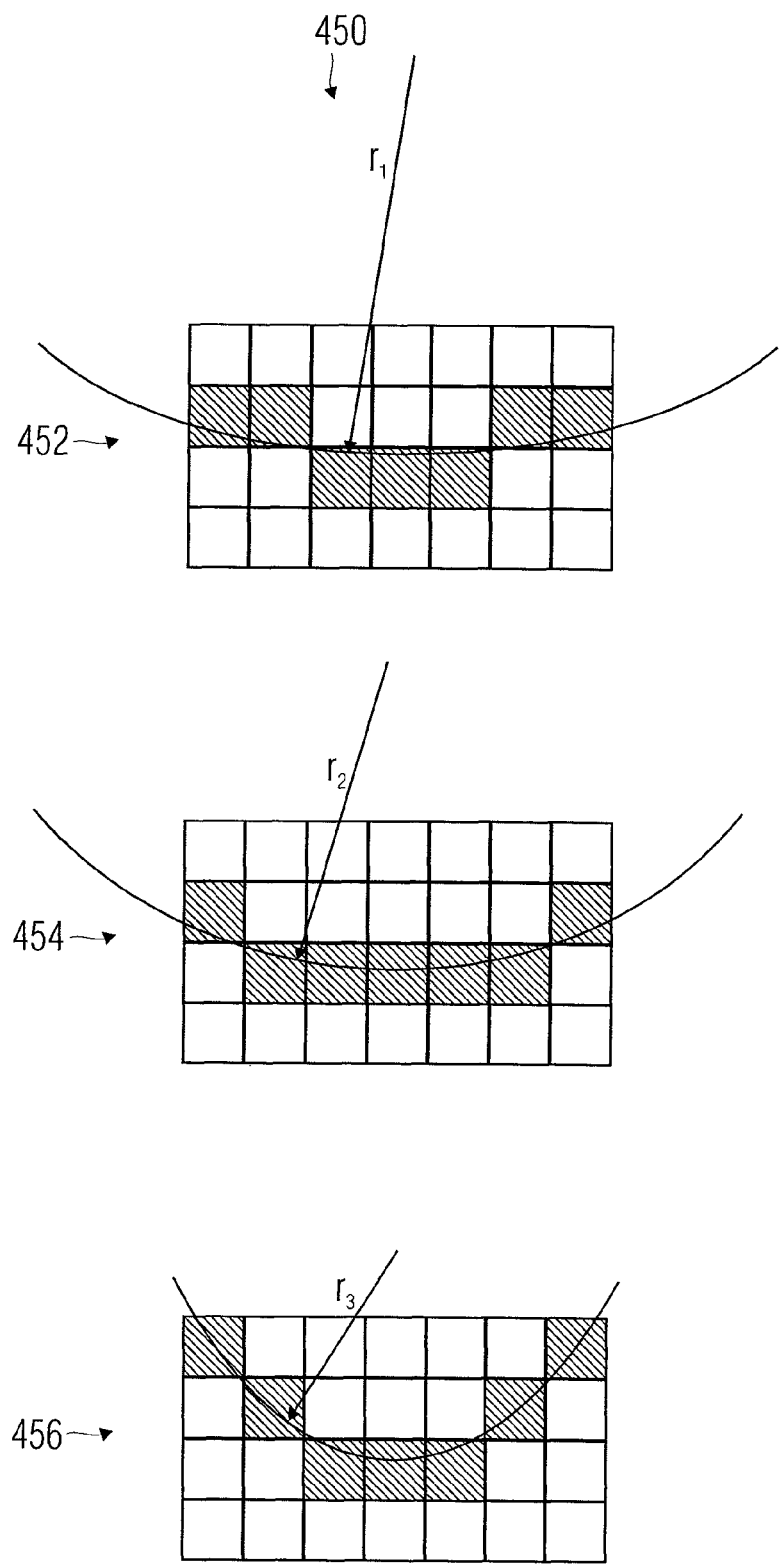
FIG. 4b is a graphical illustration of three exemplary reference curves for use in an inventive pattern recognition means.

FIG. 4b is a graphical illustration of two examples for reference curve courses for use in an inventive pattern recognition means. The graphical illustration in FIG. 4b is designated with 450 in its entirety. The first graphical illustration 452 here describes a first reference curve course approximating an excerpt from a circular curve with a first radius of curvature $r_1$ in form of a raster image. A second graphical illustration 454 describes a second reference curve course approximating an excerpt from a circular line with a second radius of curvature $r_2$ in form of a raster image, wherein the second radius of curvature $r_2$ is greater than the first radius of curvature $r_1$. A third graphical illustration 456 further shows a third reference curve course also describing an excerpt from a circular line with a third radius of curvature $r_3$ in form of a raster image. The third radius of curvature $r_3$ here is smaller than the first radius of curvature $r_1$. The three graphical illustrations 452, 454, 456 of FIG. 4b thus describe three possible reference curve courses for use in the pattern recognition means 420. In other words, the pattern recognition means 420 may for example generally be formed to recognize the three reference curve courses in the rastered image or image excerpt 414, which are shown in the graphical illustrations 452, 454, 456 of FIG. 4b, and identify them as a first bent line segment approximating the ellipse to be identified at the first ellipse point, for example. Furthermore, the pattern recognition means 420 is preferably formed to describe the location of a reference curve course recognized in the rastered image or image excerpt 414 by location parameters and to make these location parameters available to the coordinate calculation means 430, provided the location parameters mentioned do not directly represent the coordinates of a first ellipse point at which the known reference curve course approximates the ellipse to be identified.

Figure 5A:
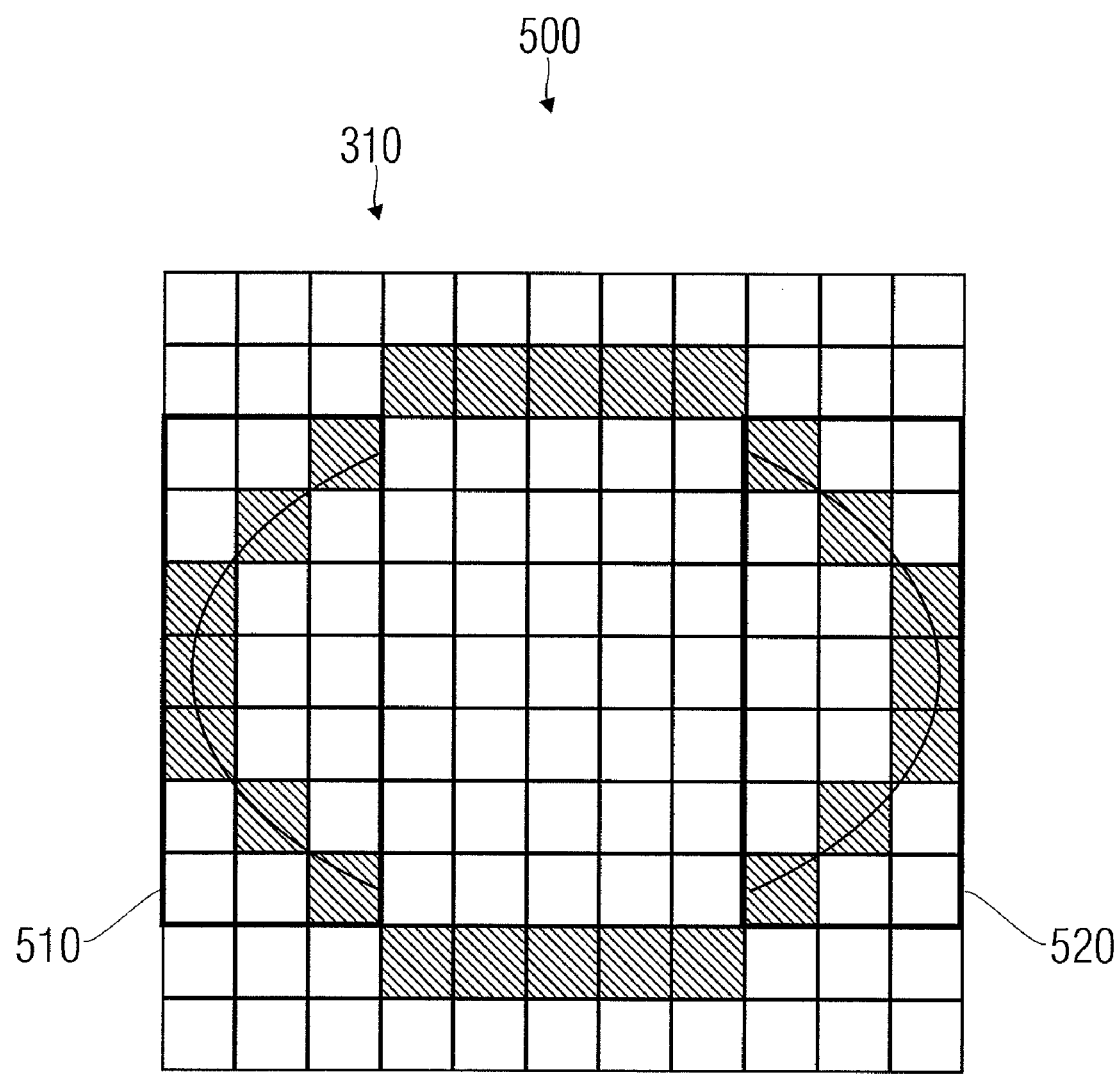
FIG. 5a is a first graphical illustration of an exemplary raster image with recognized bent line segments marked therein.

FIG. 5a shows a first graphical illustration of an exemplary raster image with recognized bent line segments characterized therein. Here, it is assumed that the pattern recognition means 420 of the apparatus 400 according to FIG. 4a, for example, is capable of recognizing the reference curve courses shown in the first graphical illustration 452, the second graphical illustration 454 as well as the third graphical illustration 456 in an image or image excerpt. Furthermore, it is assumed that the exemplary raster image 310 of FIG. 3a is supplied to the pattern recognition means 420 as rastered image 414. Furthermore, it is exemplarily assumed that the raster image 310 is supplied to the pattern recognition means either row by row or column by column. Assuming that the raster image 310 is supplied to the pattern recognition means 420 column by column, beginning at the first raster column 322, the pattern recognition means 420 may for example recognize the third reference curve course of the graphical illustration 456 in the rastered image. In the graphical illustration 500 of FIG. 5a, the curve course recognized there is designated with 510. If the raster image 310 is, however, supplied to the pattern recognition means 420 column by column, beginning with the last raster column 340, the pattern recognition means may for example recognize a further curve course, which is designated with 520 in the graphical illustration 500.

Furthermore, it is to be pointed out here that the pattern recognition means 420 may for example be supplied with only one image excerpt selected by the image excerpt selection means 412. For example, the pattern recognition means 420 may be supplied with only a limited image excerpt including the first group 370 of raster rows in a first processing step. In other words, an image excerpt including the first raster cell 320 as well as the adjacent raster rows up to the seventh raster row 368 may be supplied to the pattern recognition means 420 in the first processing step. In this image excerpt, for example, there is no curve course matching one of the reference curve courses shown in the graphical illustrations 452, 454, 456. In the second processing step, the pattern recognition means 420 may then be supplied with an image excerpt including the second group 374 of raster rows. In other words, the pattern recognition means 420 may for example be supplied with the image contents including the second raster row 330 to the eighth raster row 372 column by column (that is column by column consecutively). In this image excerpt there also is no curve course corresponding to the three reference curve courses of the graphical illustrations 452, 454, 456. In a third processing step, the image content of a third group of raster rows may then also be supplied to the pattern recognition means 420. The third group of raster rows is designated with 380 here and includes the raster rows 3 to 9. The pattern recognition means 420 may in this image excerpt identify a curve course corresponding to the third reference curve course of the graphical illustration 456. The identified curve course thus is designated with 510 in the graphical illustration 500. Furthermore, it is pointed out that adjacent groups 370, 374, 380 of raster rows overlap for improving the resolution, that is, have common raster rows. Here, it is preferred that adjacent groups of raster rows only differ by a single raster row, i.e. that adjacent groups of raster rows are shifted by exactly one raster row with respect to each other, as this is shown in FIG. 3, for example.

In other words, the apparatus 400 may be formed to process various image excerpts including various groups of raster rows successively and subject same to a pattern recognition. Thus, the pattern recognition only has to process a small image excerpt each, whereby the complexity of the pattern recognition reduces dramatically. Furthermore, the number of reference curve courses used may thereby be kept low. Furthermore, it is pointed out that from the information as to in which one of the image excerpts, i.e. using which group 370, 374, 380 of raster rows, the reference curve course can be identified, information about location of the bent line segment approximating an ellipse at the first ellipse point, the second ellipse point, the third ellipse point or the fourth ellipse point can be derived. In other words, the information as to in which one of the image excerpts the reference curve course is identified represents a location parameter of the bent line segment and may thus be used to determine at least one coordinate of the first ellipse point, the second ellipse point, the third ellipse point or the fourth ellipse point.

Similarly, the first image 310 may also be supplied to the pattern recognition means 420 row by row, that is row by row consecutively. Here, several image excerpts including various groups 360, 364 or raster columns can be processed one after the other. The statements made with reference to the column-wise processing of a group of raster rows apply in analog manner here.

Figure 5B:
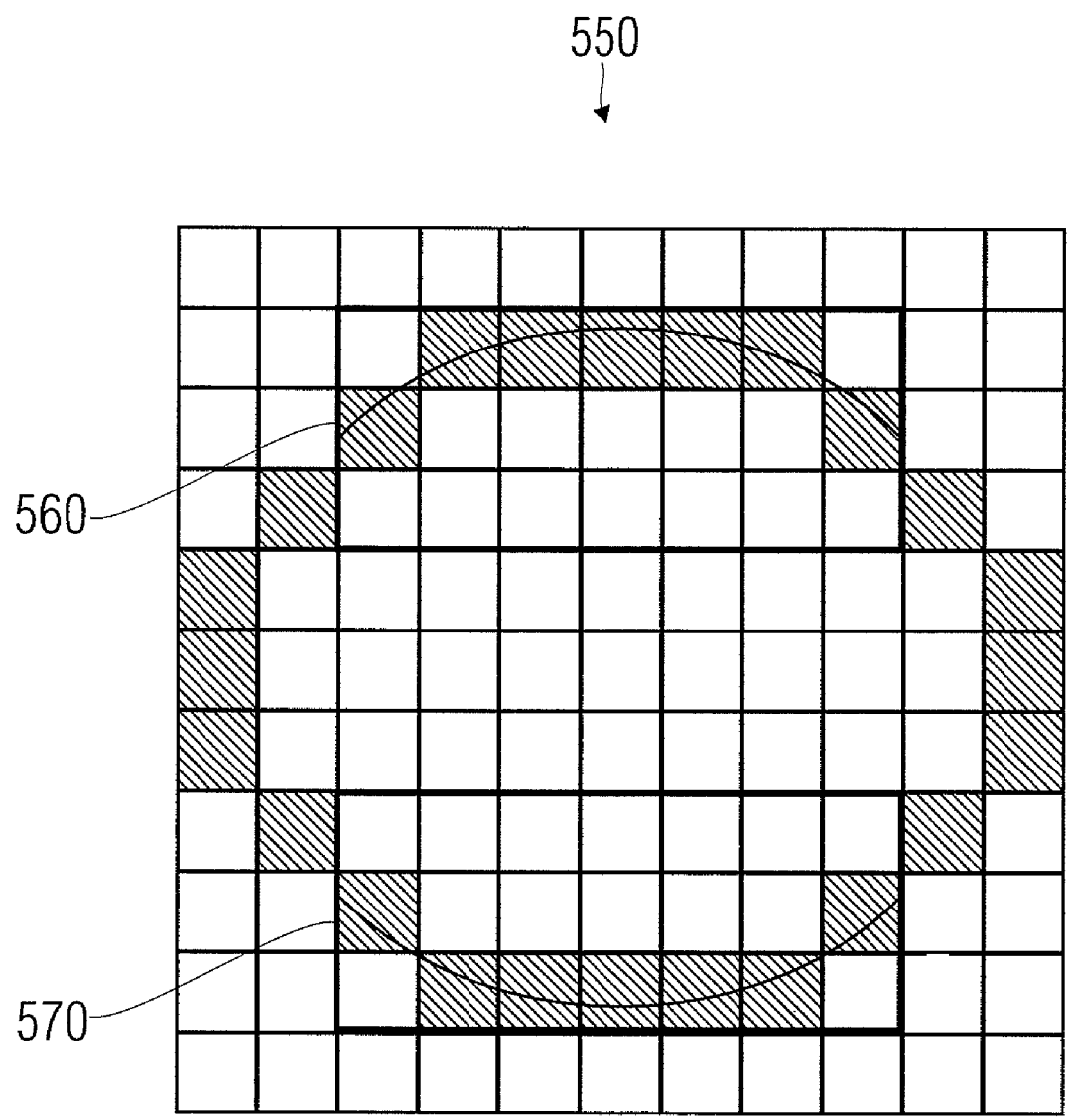
FIG. 5b is a second graphical illustration of an exemplary raster image with recognized bent line segments marked therein.

Furthermore, it is pointed out that FIG. 5b shows a second graphical illustration of an exemplary raster image with recognized bent line segments labeled therein. The recognized bent line segments designated with 560 and 570 in the graphical illustration 550 of FIG. 5b correspond to the reference curve course shown in the graphical illustration 454.

Furthermore, it is pointed out that it is advantageous to supply a raster image 310 to the pattern recognition means 420 column by column, beginning with the first raster column 322 for a first time, and to supply the raster image 310 to the pattern recognition means 420 column by column, beginning with the last raster column 340 for a second time. Here, in the first pass beginning with the first raster column 322, curve courses of a first direction of curvature can be recognized, while curve courses with a direction of curvature opposite thereto can be recognized in the second pass beginning with the last raster column 340. In the same way, the line-wise processing of the raster image 310 one time beginning with the first raster row 320 and one time beginning with the last raster row 334 may take place to be able to identify again curve courses with different curvature behavior with the aid of a pattern recognition means only designed for the recognition of curve courses with a single curvature behavior or with a single direction of curvature.

Figure 6:
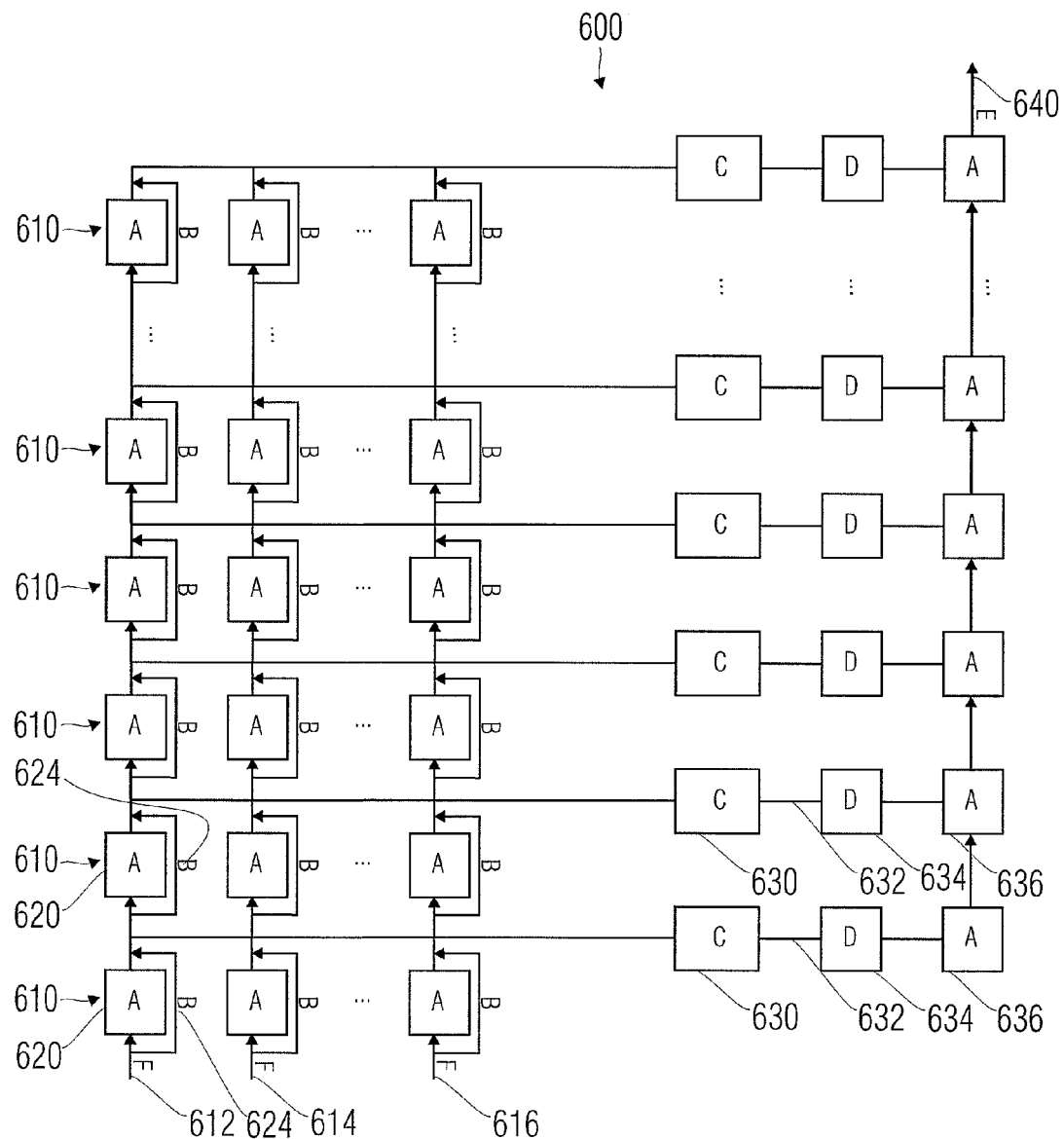
FIG. 6 is a block circuit diagram of a pattern recognition means for use in an inventive apparatus for determining information about shape and/or location of an ellipse in a graphical image.

FIG. 6 shows a block circuit diagram of a pattern recognition means for use in an inventive apparatus 400. The circuit of FIG. 6 is designated with 600 in its entirety and describes a so-called "Hough array" for performing a Hough transform. The pattern recognition means 400 realizing the coordinate determination means 110 may preferably perform a search for circular curves of different radii, which describe an ellipse to be identified around the extreme point, i.e. around the first ellipse point, the second ellipse point, the third ellipse point or the fourth ellipse point, in sufficient approximation. This may be done by a parallel systolic Hough transform in especially advantageous manner. The Hough transform may be configured for circular curves and may be adapted for extreme value search, i.e. for the identification of points located furthest in a certain direction.

FIG. 6 shows a particularly advantageous means for performing a Hough transform. The means 600 for Hough transform here includes a plurality of stages 610 connected one behind the other, through which several signals 612, 614, 616 are forwarded in parallel. For each signal, one stage contains either a delay element 620, which is also designated with A, or a bypass 624, which is also designated with B. Furthermore, the signals are supplied to a summing element 630, which is also designated with C, at the output of a stage. Here, the summing element is preferably formed to determine how many signals are active at the same time at the output of the respective stage. At an output 632 of a summing element 630, a so-called row sum is present, which indicates how many signals at the output of the respective stage are active at the same time. The row sum 632 may then be supplied to a comparator 634 comparing the row sum 632 with a given threshold value. If the row sum 632 exceeds the given threshold value, this means that at least a given number of signals are active in the respective stage. In other words, an at least approximately "straight line" characterized by the fact that at least a given number of signals of the respective stage are active at the same time is present in the respective stage. An output signal of the comparator 634 is then supplied to a delay element 636. Several delay elements 636 each connected to an output of a comparator 634 of a stage 610 are connected in a chain here such that the output signal of a delay element 636 is supplied to the input of a subsequent delay element 636.

Furthermore, it is pointed out that the delay elements 620, 636 operate in clocked manner, so that both the signal 612, 614, 616 and the output signals of the comparators 334 are forwarded in clocked manner. The signals 612, 614, 616 and the output signals of the comparators 334 are forwarded in parallel and in the same direction from the structure, but with the signals 612, 614, 616 being delayed differently in the individual stages, depending on whether a delay element 620 or a bypass 624 is used in a stage 610 when forwarding the signal 612, 614, 616. It is preferred, however, that a central signal of the plurality of signals 612, 614, 616 is forwarded through the plurality of stages as quickly as the signals from the outputs of the comparators 634. The central signal is preferably delayed equally in each of the stages, and the output signals of the comparators 634 are also preferably forwarded through the stages with constant delay. The central signal preferably is approximately at the center between the first signal 612 and the last signal 614, i.e. describes a raster row at the center of the image excerpt supplied to the Hough transform means 600, or is a maximum of 25% of a width of the image excerpt away from the center of the image excerpt. The width of the image excerpt is defined by the number of raster rows or raster columns supplied to the Hough transform means 600 at the same time.

Based on the structural description, the functioning of the pattern recognition means 600 will be described in greater detail in the following. It is assumed that an image excerpt in form of parallel time signals 612, 614, 616 is supplied to the Hough transform means 600. The delay elements 620 or the bypasses 624 are configured so that various time signals 612, 614, 616 are delayed differently when passing through the individual stages. The delays are adjusted so that a bent curve course (preferably a circularly bent curve course) is bent straight after passing through one stage or several stages 610, by switching on delay elements 620 or bypasses 624. In other words, a bent curve course in the image excerpt processed by the Hough transform means does result in the individual signals 612, 614, 616 being active at different times. By suitable adjustment of the delay elements 620 and/or the bypasses 624, however, it may be achieved that signals 612, 614, 616 pass through the individual stages at different speeds, so that after passing through a certain number of stages 610, all forwarded signals based on the signals 612, 614, 616 are ideally active at the same time at the output of a stage. In this case, in the particular stage, an especially large row sum occurs, which is calculated by the corresponding summing means 630. An occurrence of such a large row sum may lead to the fact that the comparator 634 of the respective stage outputs an active signal, which in turn is forwarded to the output 640 of the Hough transform means via the chain of delay elements 636. From the temporal position of activity on the output signal at the output 640 of the Hough transform means 600, location of a curve course in the image excerpt input to the Hough transform means 600 in form of time signals 612, 614, 616 can be inferred.

Furthermore, it is pointed out that it is preferred that a predetermined signal (also referred to as central signal) from the signals 612, 614, 616 passes through the stages 610 of the Hough transform means 600 as quickly as an output signal from the outputs of the comparators 634, which is forwarded by the chain of delay elements 636. In other words, at least one of the input signals 612, 614, 616 propagates in parallel and at a speed equal to the output signals of the comparators 634. Thereby, it may be achieved that the output signal present at the output 640 of the Hough transform means 600, which is based on the signals of the comparators 634 forwarded in the chain of delay elements 636, carries a direct indication about the time instant of occurrence of a bent line segment in the input signals 612, 614, 616. Here, the time instant of occurrence of activity on the output signal at the output 640 of the Hough transform means 600 gives an indication as to at which time instant a bent line course was input in the Hough transform means in form of input signals 612, 614, 616. The time instant of the presence of a bent sample course in the signals 612, 614, 616 of course enables direct conclusions regarding a spatial location of the bent curve course in the raster image underlying the signals 612, 614, 616.

Furthermore, it is pointed out that in the given design, in which at least one of the signals 612, 614, 616 propagates through the stages 610 exactly as quickly as the output signals of the comparators 634, the exact shape of the curvature, for example the radius of curvature, in a bent curve only has influence on the fact as to in which one of the stages 610 a comparator 634 becomes active. The exact shape of the bent curve course does, however, not have any influence on the time instant at which activity occurs at the output 640 of the Hough transform means 600, in the depicted design.

Thus, it can be stated that the Hough transform means 600 shown in FIG. 6 is suited to determine the location of a bent curve course in a raster image in very efficient manner by transforming the raster image (or an excerpt therefrom) to a plurality of parallel signals, which then pass through several stages of the Hough transform means 600 at different velocities. By the formation of a column sum at the outputs of the columns 610, it can be recognized if at least a given number of signals at the outputs of the stages are active at the same time, which in turn indicates that the original passing curve course has been "bent straight".

Preferably, the Hough transform means 600 is formed, by suitable choice of delay elements 620 or bypasses 624, to bend curve courses described by signals 612, 614, 616 straight, which are capable of approximating the ellipse at the first ellipse point, the second ellipse point, the third ellipse point or the fourth ellipse point. Furthermore, preferably only such curve courses capable of approximating an ellipse at the first ellipse point, the second ellipse point, the third ellipse point or the fourth ellipse point are bent straight. Thus, the Hough transform means 600 according to FIG. 6 is suited to identify the first bent line segment, the second bent line segment, the third bent line segment or the fourth bent line segment. The time instant at which an output signal is present at the output 640 of the Hough transform means 600 describes a location of the identified curve course in the raster image underlying the signals 612, 614, 616, i.e. a parameter of the first bent line segment, the second bent line segment, the third bent line segment or the fourth bent line segment.

Figure 7A:
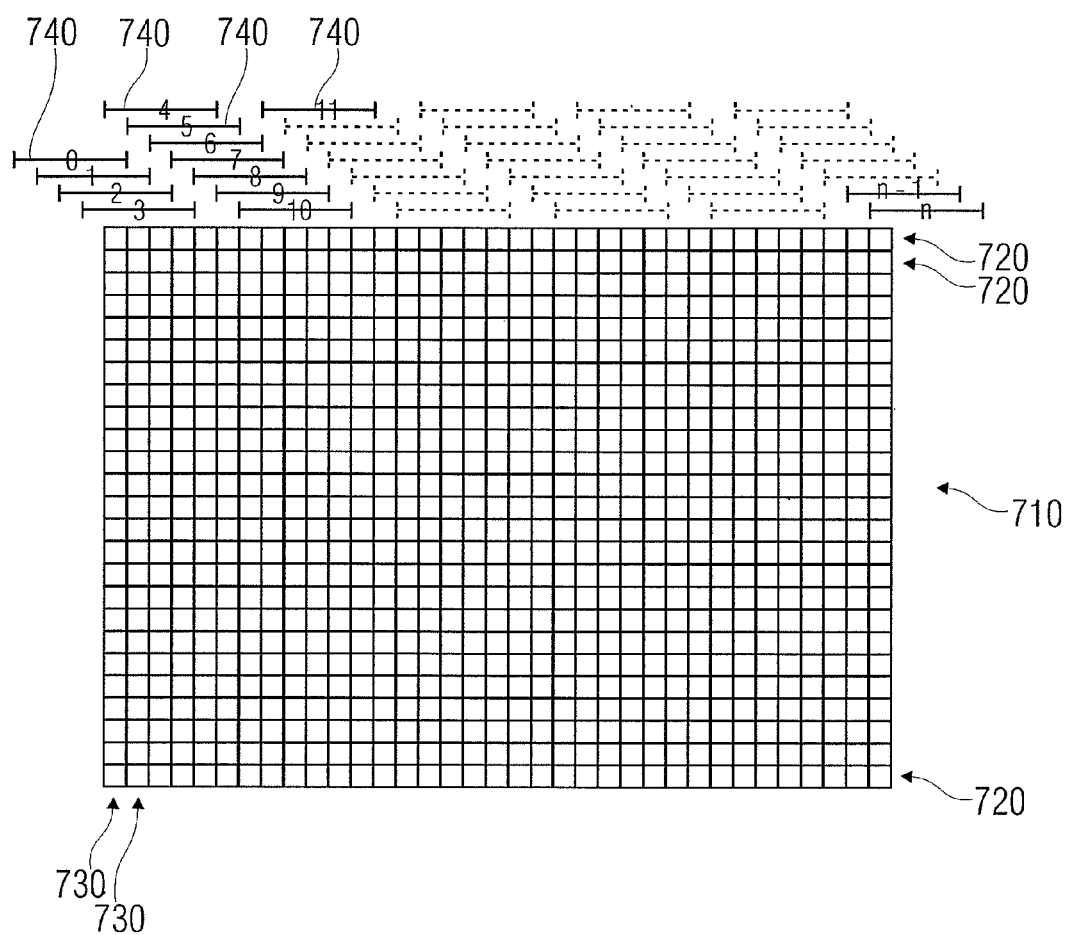
FIG. 7a is a graphical illustration of a procedure for pushing a graphical image through the pattern recognition means according to FIG. 6.

FIG. 7a shows a graphical illustration of a procedure for pushing a graphical image through a pattern recognition means. In particular, FIG. 7a shows column-wise pushing of an image or raster image through the Hough transform means 600 shown in FIG. 6 (also referred to as Hough field or Hough array).

FIG. 7a here shows a raster image 710 consisting of a plurality of raster rows 720 as well as a plurality of raster columns 730. Furthermore, groups 740 of preferably five raster columns 730 each are shown, wherein it is assumed that five raster columns each are supplied to the Hough transform means 600 in parallel in form of signals 612, 614, 616 at the same time. For further details, please refer to the graphical illustration 300 of FIG. 3.

Figure 7B:
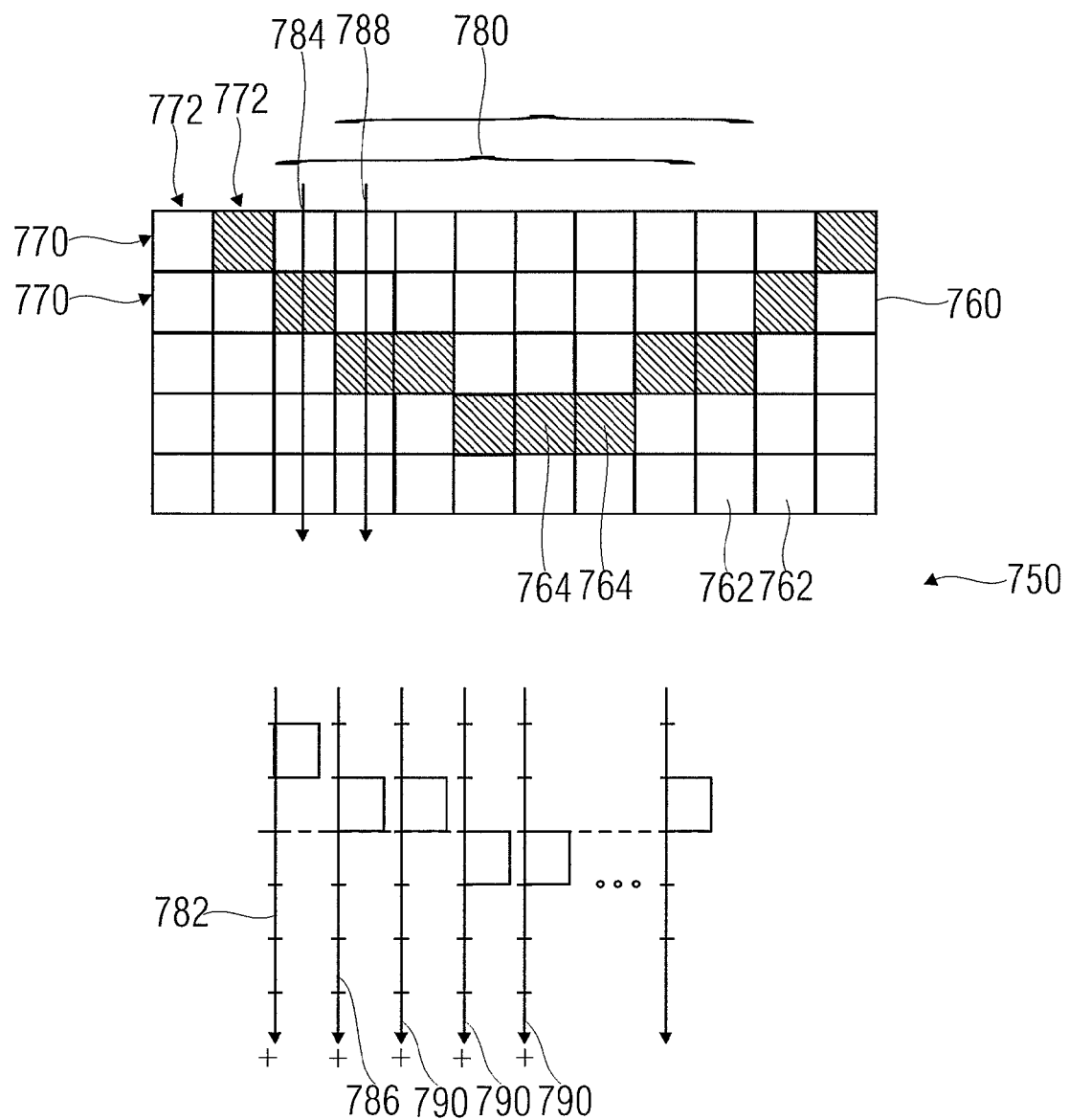
FIG. 7b is a graphical illustration of time signals developing in the conversion of a raster image into parallel time signals.

FIG. 7b shows a graphical illustration of time signals developing in a conversion of a raster image to parallel time signals. The graphical illustration of FIG. 7b is designated with 750 in its entirety. The graphical illustration 750 shows a raster image 760 comprising a plurality of inactive raster points or image points 762 as well as a plurality of active raster points or image points 764 characterized by hatching. The active raster points or image points 764 preferably describe a curve course. As already described above, the raster image 760 here includes a plurality of raster rows 770 as well as a plurality of raster columns 772. Furthermore, it is assumed that time signals are formed based on an image excerpt 780 including a group of seven raster columns. For example, a first time signal 782 is associated with a first raster column 784 included in the group 780 of raster columns. The time signal 782 here develops by column-wise sampling of the raster image 780 along the associated raster column 784. Similarly, a second time signal 786 develops by row-wise sampling of the second raster column 788 from the group 780 of raster columns. When taking a look at the time courses, it becomes clear that active raster points lying in the same raster row of the raster image 760 result in simultaneous activity impulses on the time signals 782, 786, 790 in the sampling direction described. A horizontal line, that is a line passing within a raster row thus makes itself felt in the time signals 782, 786, 790 by simultaneous impulses on the time signals 782, 786, 790.

If it is now assumed that the time signals 782, 786, 790 are supplied to a Hough transform means 600 as input signals 612, 614, 616 and that the signals 612, 614, 616 are delayed differently in individual stages 610 of the Hough transform means 600, it becomes clear that the different delay of the time signals 782, 786, 790 corresponds to a distortion of the raster image 760, whereby a bent curve course may be bent to a straight line. But a straight line corresponding to simultaneous activity of several ones of the time signals 782, 786, 790 can be recognized in the Hough transform means 600, as described above.

Figure 8:
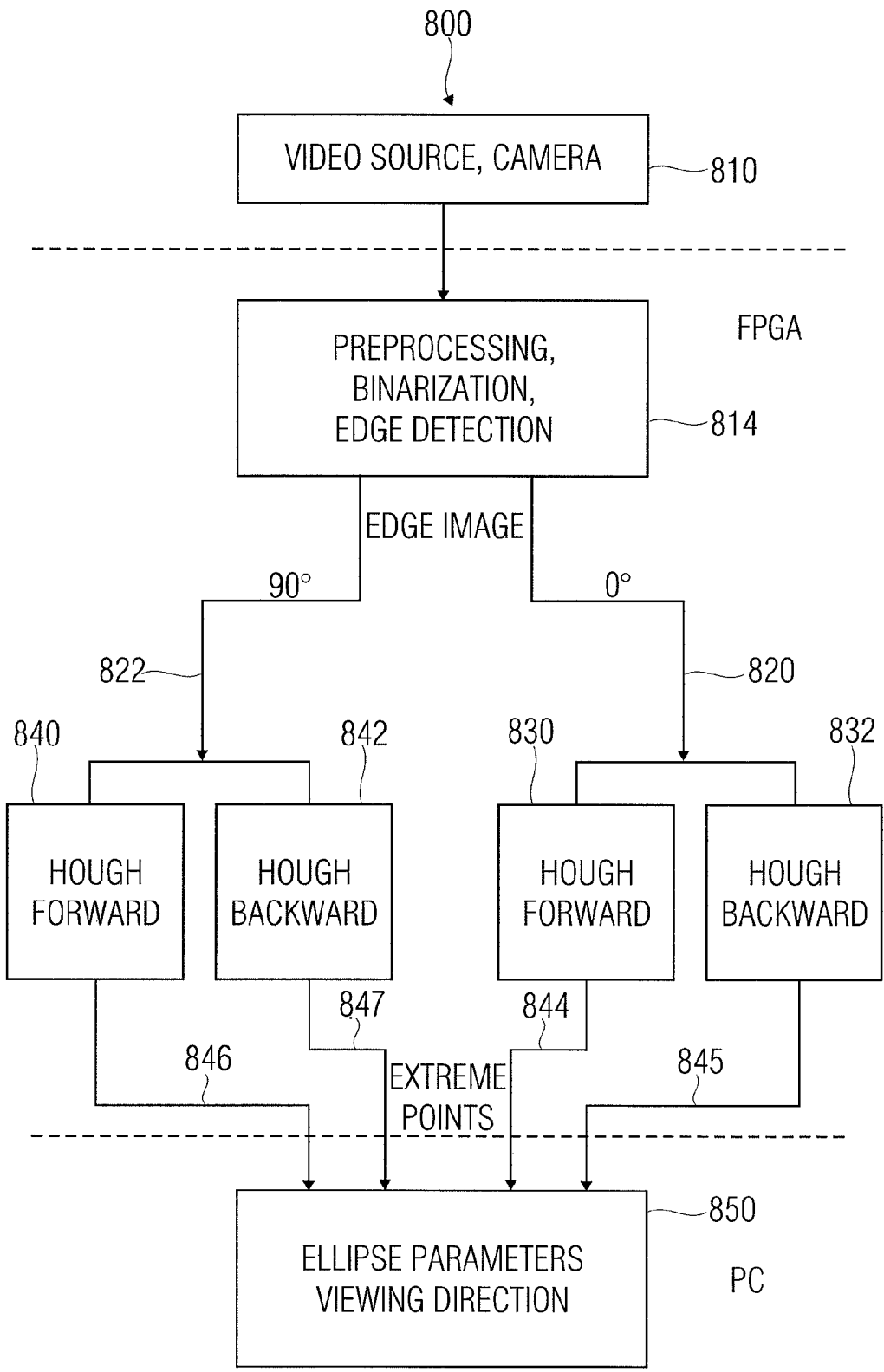
FIG. 8 is a block circuit diagram of an inventive apparatus for determining information about shape and/or location of an ellipse in a graphical image, according to a third embodiment of the present invention.

FIG. 8 shows a block circuit diagram of an inventive apparatus for determining information about shape and/or location of an ellipse in a graphical image, according to a third embodiment of the present invention. The inventive apparatus of FIG. 8 is designated with 800 in its entirety and is formed to determine a viewing direction of a human or an animal, based on a graphical image 812 provided from a video source or a camera 810. The video source 810, which for example includes a camera, provides video data 812 to a preprocessing means 814. The preprocessing means 814 may be integrated in its own field programmable gate array (FPGA) or in an application specific integrated circuit (ASIC). The preprocessing means 814 may, however, also be accommodated in a single FPGA with the Hough transform means or Hough fields (Hough arrays) described in the following. Preferably, the preprocessing means 814 is formed to convert the video data 812 to edge images via threshold value binarization for the generation of binary images and ensuing edge extraction from the binary images developing in the threshold value binarization. The edge extraction from the binary images may be done on the basis of dilatation (stretching) and subtraction, whereby binary edge images develop. In other words, the preprocessing means 814 may be formed to compare brightness and/or a gray value of the video data with a threshold value, and to generate a binary image only differentiating light or dark image areas, based on the comparison result. From the binary image, then a stretched or shrunk version of the binary image can be generated, whereupon a difference between the original binary image and the stretched or shrunk binary image is determined. The difference may then be used for the generation of the edge image, which describes edges in the video data 812.

After the preprocessing in the preprocessing means 814, the edge image then is preferably available for further processing in a first direction as well as in a second direction perpendicular thereto. The edge image may, however, also be filed in a single memory, which enables access to the edge image along a first direction and along a second direction orthogonal thereto. The processing of the edge image in the first direction may for example mean column-wise processing of the edge image, while the processing in the direction orthogonal thereto can mean row-wise processing of the edge image. The edge image, which is present for the processing in the first direction, is designated with 820, wherein the edge image present for the processing in the direction orthogonal thereto is designated with 822. The edge image 820 present for the processing in the first direction is then supplied to a first Hough transform means 830 (also referred to as Hough field or Hough array) in parallel, which is formed to recognize a bent curve course of a first direction of curvature. The edge image 820 is further supplied to a second Hough transform means 832, which is formed to recognize a bent curve course of a second direction of curvature opposite to the first direction of curvature.

The two Hough transform means 830, 832 may, however, also be formed alike, wherein the first Hough transform means 830 is supplied with the edge image, beginning at a first edge, and wherein the second Hough transform means is supplied with the edge image, beginning at a second edge, wherein the first edge is opposite to the second edge. For example, if the first Hough transform means 830 is supplied with the edge image 820 row by row, beginning with the first raster row, the second Hough transform means 832 may be supplied with the edge image 820 row by row, beginning with the last raster row.

The two Hough transform means 830, 832 are formed to identify bent line segments in the edge images 820, which approximate an ellipse in the video data 812 at the first ellipse point, the second ellipse point, the third ellipse point or the fourth ellipse point. Furthermore, the Hough transform means 830, 832 are formed to identify the coordinates of the associated ellipse points based on the identified bent line segments. Similarly, the edge image 822 present for processing in the second direction is supplied to a third Hough transform means 840 and a fourth Hough transform means 842, wherein the third Hough transform means 840 corresponds to the first Hough transform means 830 regarding its principle functioning, and wherein the fourth Hough transform means 842 corresponds to the second Hough transform means 832 regarding its principle functioning. Thus, the first Hough transform means 830, the second Hough transform means 832, the third Hough transform means 840 as well as the fourth Hough transform means 842 provide the coordinates 844, 845, 846, 847 of the first ellipse point, the second ellipse point, the third ellipse point and the fourth ellipse point.

Here, it is pointed out that the four Hough transform means 830, 832, 840, 842 preferably are realized in an FPGA, as will still be described later. An ellipse calculation means 850 preferably realized in a personal computer (PC) is further formed to calculate the ellipse parameters based on the coordinates 844, 845, 846, 847 of the first ellipse point, the second ellipse point, the third ellipse point and the fourth ellipse point. From the ellipse parameters, the viewing direction of the human or animal observed by the video source 810 may also be calculated.

In other words, the binary images 820, 822 rotated by 90° opposite to each other go into the Hough arrays 830, 832, 840, 842, in which all four extreme point types are sebent, i.e. four labeled ellipse points. From the extreme points, i.e. the first ellipse point, the second ellipse point, the third ellipse point and the fourth ellipse point, then the ellipses and/or the parameters thereof are calculated in a personal computer, for example, and then the viewing direction of the human or animal is determined therefrom.

Otherwise, it is pointed out that, as already explained above, the coordinates 844 of the first ellipse point and the coordinates 845 of the second ellipse point may be sufficient to calculate at least the coordinates of the center of the ellipse to be determined. For this reason, the calculation of the edge image 822 rotated by 90° may be omitted, whereby the third Hough transform means 840 and the fourth Hough transform means 842 may also be omitted.

Furthermore, at least the fourth Hough transform means 842 also may be omitted if all ellipse parameters are to be calculated, because the coordinates of three extreme points of the ellipse are sufficient for such a calculation.

Furthermore, it is pointed out that the preprocessing unit may be varied arbitrarily, as long as it is ensured that the Hough transform means 830, 832, 840, 842 can be supplied with an edge image. Furthermore, processing shown as parallel here may also take place sequentially, as long as enough time is available.

Figure 9:
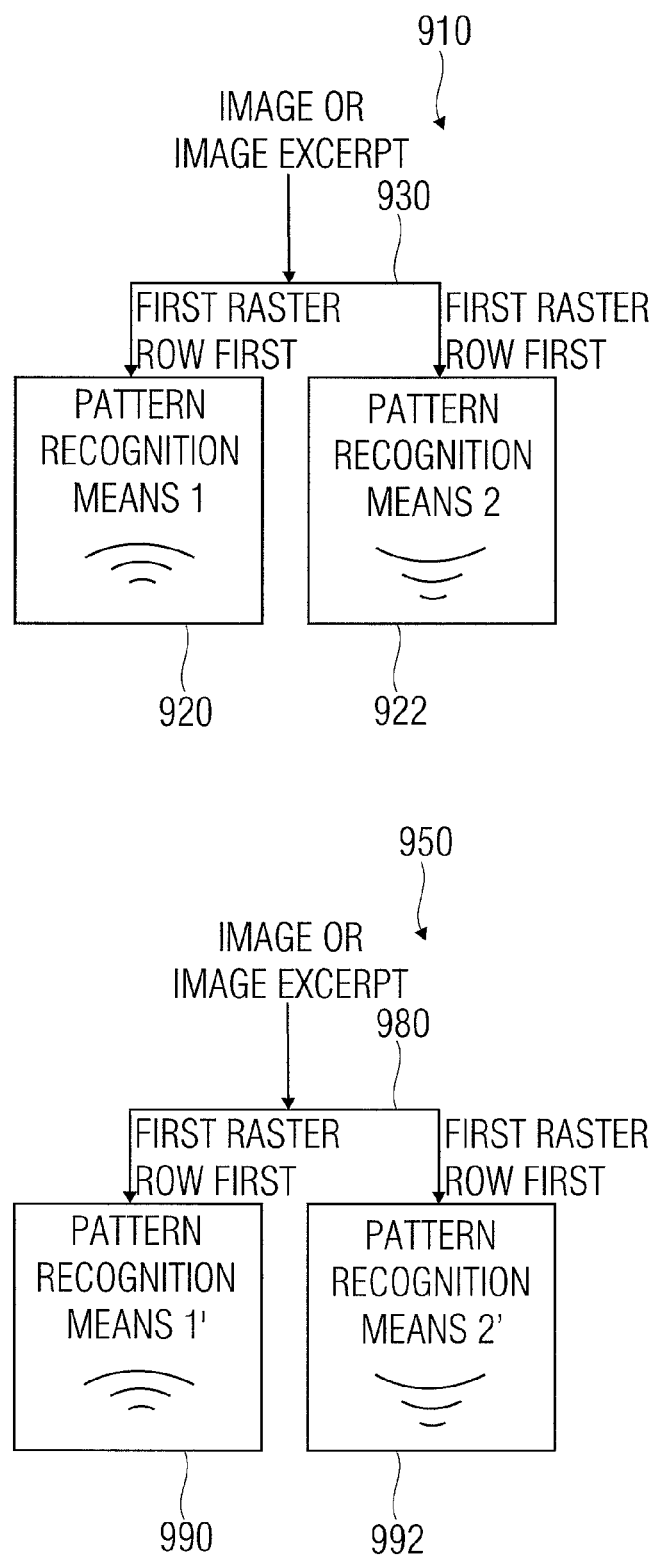
FIG. 9 is an excerpt from a block circuit diagram of an inventive apparatus for determining information about shape and/or location of an ellipse in a graphical image, according to a fourth embodiment of the present invention.

FIG. 9 shows an excerpt from a block circuit diagram of an inventive apparatus for determining information about shape and/or location of an ellipse in a graphical image, according to a fourth embodiment of the present invention. Here, FIG. 9 shows a possibility for identifying bent line segments of different direction of curvature using two different pattern recognition means 920, 922, in an excerpt 910 from a block circuit diagram. The first pattern recognition means 920 is formed here to recognize bent curve courses of a first direction of curvature, whereas the second pattern recognition means 922 is formed to recognize bent curve courses with a second direction of curvature, wherein the second direction of curvature is opposite to the first direction of curvature. An image or image excerpt 930 may here be supplied to both pattern recognition means 920, 922 in the same way. In other words, the first pattern recognition means 920 is supplied with the image or image excerpt 930 such that the first raster row is supplied first. The second pattern recognition means 922 is also supplied with the image or the image excerpt 930 so that the first raster row is supplied first. The application of the first pattern recognition means 920 and the second pattern recognition means 922 may here be done simultaneously one after the other. Furthermore, it is pointed out that the term raster row may also be replaced by the term raster column with respect to the block circuit diagram 910.

A second block circuit diagram 950 shows a second possibility for the recognition of bent curve courses with different direction of curvature in an image or image excerpt 980. To this end, for example, the image or the image excerpt 980 can be supplied to the first pattern recognition means 990 beginning with a first raster row. Furthermore, the image or the image excerpt 980 can be supplied to a second pattern recognition means 992 beginning with the last raster row. The two pattern recognition means 990, 992 both are formed here to recognize only bent curve courses of a first direction of curvature. By supplying the image or image excerpt 980 in different directions, it may thus be achieved that the first pattern recognition means 990 recognizes a bent curve course in the image excerpt, which has the first direction of curvature in the original image, whereas the second pattern recognition means 992 may recognize a bent curve course in the original image or image excerpt 980, which has a second direction of curvature opposite to the first direction of curvature in the original image. Furthermore, it is pointed out that two separate pattern recognition means 990, 992 are not necessary if the image or the image excerpt 980 is for example supplied to the first pattern recognition means 990 one after the other, first beginning with the first raster row and then beginning with the last raster row. The second pattern recognition means 992 may also be omitted in this case.

It is pointed out that the described embodiments according to the block circuit diagrams 910 and 950 may for example be employed in the apparatus 800, depending on which realization seems advantageous.

In the following, the determination of the ellipse parameters from the coordinates of the first ellipse point, the second ellipse point and the third ellipse point will be described in greater detail. Here, it is pointed out that the first ellipse point, the second ellipse point and the third ellipse point are also referred to "extreme points" in the following.

In a first step, the coordinates $(x_m, y_m)$ of the ellipse center 240 may here be calculated from the coordinates of the first ellipse point and of the second ellipse point. Here, it is to be pointed out that the definitions of the graphical illustrations 200, 250 of FIGS. 2a and 2b will be used in the following, which already have been explained in detail previously. Furthermore, it is pointed out that, due to the symmetry of the ellipse, the center always lies exactly in the middle between two opposite extreme points, as it also can be taken from the graphical illustration 200 of FIG. 2a. Thus, $$x_m = \frac{x_1 + x_3}{2} = \frac{x_0 + x_2}{2}$$

and $$y_m = \frac{y_1 + y_3}{2} = \frac{y_0 + y_2}{2}$$

apply.

In the following, the determination of the shape parameters of the ellipse, i.e. the length a of the first semiaxis of the ellipse, the length b of the second semiaxis of the ellipse and the rotational angle α, will further be described.

The description of the shape parameters from the coordinates $(x_1, y_1)$, $(x_2, y_2)$, $(x_3, y_3)$, $(x_4, y_4)$ of the extreme points is more difficult. With the known center $(x_m, y_m)$ the ellipse is at first shifted into the coordinate origin, as already described with reference to FIG. 2b.

For this reason, a rotated ellipse 270 at the coordinate origin 262 will be assumed in the following. It has four points of contact with a smallest possible, adjacent rectangle. Two points of contact each are rotationally symmetrical to the coordinate origin. For this reason, only the two points 276, 280 in the first quadrant are considered.

The equations (1.1) shown in the following describe an ellipse rotated by α in the coordinate origin in the parameter form.

$$x = a \cdot \cos\theta \cdot \cos\alpha - b \cdot \sin\theta \cdot \sin(\alpha)$$

$$y = a \cdot \cos\theta \cdot \sin\alpha + b \cdot \sin\theta \cdot \cos(\alpha) \tag{1.1}$$

Here, x and y are coordinates of ellipse points depending on the parameter θ. The remaining parameters α, a and b have the already above Solving the system of equations (1.1) for tan(θ) results in:

$$\tan(\theta) = \frac{a}{b} \cdot \frac{y - x \cdot \tan\alpha}{y \cdot \tan\alpha + x} \tag{1.2}$$

From the condition for the x extreme value $$0 = \frac{\partial x}{\partial \theta_x} = -a \cdot \sin\theta_x \cdot \cos\alpha - b \cdot \cos\theta_x \cdot \sin\alpha, \tag{1.3}$$

equation (1.4) can be derived as $$\tan\theta_x = -\frac{b}{a} \cdot \tan\alpha, \tag{1.4}$$

and from the condition for the y extreme value $$0 = \frac{\partial y}{\partial \theta_y} = -a \cdot \sin\theta_y \cdot \sin\alpha - b \cdot \cos\theta_y \cdot \cos\alpha, \tag{1.5}$$

equation (1.6) can be derived as $$\tan\theta_y = \frac{b}{a} \cdot \frac{1}{\tan\alpha}. \tag{1.6}$$

The equations describe the locations of the extreme points depending on θ. In other words, $\theta_x$ and $\theta_y$ describe parameter values of the parameter θ for the transformed first ellipse points 276 and for the transformed third ellipse point 280, respectively, with respect to the equation (1.1).

Equating the equations (1.2) and (1.4), and/or the equations (1.2) and (1.6), after the substitutions $$\tan(\alpha) = u, \quad \frac{x_x}{y_x} = k_x \quad \text{and} \quad \frac{y_y}{x_y} = k_y,$$

leads to:

$$\frac{b^2}{a^2} = \frac{k_x \cdot u - 1}{u^2 + k_x \cdot u} \tag{1.7}$$

and $$\frac{b^2}{a^2} = \frac{k_y \cdot u - u^2}{k_y \cdot u + 1}. \tag{1.8}$$

In the following, the calculation of the rotational angle α will be explained. For calculating the rotational angle, the square axis ratio $$\frac{a^2}{b^2}$$

of the ellipse can be eliminated by equating the equations (1.7) and (1.8). This leads to a fourth-order equation:

$$u^4 + u^3 \cdot (k_x - k_y) + u \cdot (k_x - k_y) - 1 = 0 \tag{1.9}$$

The results were found with the Maple computer algebra program. Two of the four results of the equation (1.9) are imaginary. The other two solutions $u_1$ and $u_2$ are:

$$u_{1,2} = -\frac{1}{2} \cdot (k_x - k_y) \pm \frac{1}{2} \cdot \sqrt{(k_x - k_y)^2 + 4} \tag{1.10}$$

After the reverse substitution, the two results for α differ by exactly by 90°, because an ellipse rotated by 90° is equal to a non-rotated ellipse with reciprocal axis ratio. The correct result can be determined by a case differentiation:

If $x_x$ and $y_y$ have the same sign:

$$u = -\frac{1}{2} \cdot (k_x - k_y) + \frac{1}{2} \cdot \sqrt{(k_x - k_y)^2 + 4} \tag{1.11}$$

In the case of different signs, however:

$$u = -\frac{1}{2} \cdot (k_x - k_y) - \frac{1}{2} \cdot \sqrt{(k_x - k_y)^2 + 4} \tag{1.12}$$

applies.

Now, the axis ratio $$\rho = \frac{a^2}{b^2}$$

can be determined from equation (1.7) or equation (1.8) with the known rotational angle.

In the following, a calculation of the length of the semiaxis will be described.

Until now, the rotational angle α and the axis ratio ρ have been determined. For the calculation of the lengths of the semiaxis, the ellipse equation has to be used once again. From the locations of the extreme points $\theta_x$ und $\theta_y$, the following system of equations results:

$$x_x = a \cdot \cos(\theta_x)\cos(\alpha) - b \cdot \sin(\theta_x)\sin(\alpha)$$

$$x_y = a \cdot \cos(\theta_y)\cos(\alpha) - b \cdot \sin(\theta_y)\sin(\alpha) \quad (1.13)$$

Therefrom, a can be eliminated by extension and subtraction:

$$x_x \cdot \cos\theta_y - x_y \cdot \cos\theta_x = = b \cdot \sin\alpha \cdot (-\cos\theta_y \cdot \sin\theta_x + \cos\theta_x \cdot \sin\theta_y) \quad (1.14)$$

By inserting (1.4) and (1.6) into (1.14), $\theta_x$ and $\theta_y$ can be eliminated. What remains is an expression for the semiaxis b dependent on the rotational angle α, the axis ratio ρ and the x coordinates of two extreme points:

$$b = \frac{\rho \cdot \tan\alpha \cdot \left( x_x \cdot \sqrt{\frac{\rho^2 + \tan^2\alpha}{\rho^2}} - x_y \cdot \sqrt{\frac{\rho^2 \cdot \tan^2\alpha + 1}{\rho^2 \cdot \tan^2\alpha}} \right)}{\sin\alpha \cdot (\tan^2\alpha + 1)} \quad (1.15)$$

From the axis ratio ρ and the semiaxis b, the missing semiaxis α can be calculated without any problems:

$$a = \rho \cdot b \quad (1.16)$$

In the following, the problem of the redundancy of the systems or equations in the calculation of the ellipse parameters will be dealt with. Here, at first the problem itself will be illustrated. Furthermore, it will be described how the redundancy can be taken advantage of to increase the reliability of the inventive apparatus and the inventive method.

With four extreme points found, the ellipse is redundant. For the determination of the five parameters of the ellipse, only five coordinates from the four possible extreme points (8 coordinates) are needed. For this reason, only "2.5 ellipse points" are needed.

Two opposite extreme points are needed for the determination of the center. From tests it has been found that the following equation always applies for an ellipse according to FIG. 2b:

$$1 = \frac{y_y}{y_x} \cdot \frac{3\theta_y}{x_x} \quad (1.17)$$

This means that for the determination of all four values $x_x$, $x_y$, $y_x$ and $y_y$, three measured values are sufficient. Two thereof necessarily are known from the determination of the center. A further coordinate of the third point then has to be used for the determination of the remaining ellipse parameters.

For example, point 1 and point 3, i.e. the first ellipse point 226 and the second ellipse point 228, are used for the determination of the center 240. After shifting into the coordinate origin, $x_x$ becomes of $x_3 - x_m$, and $y_x$ of $y_3 - y_m$. Thus, $x_x$ and $y_x$ describe an extreme value in x direction. From a further coordinate of the extreme point in y direction, the fourth value can be determined by equation (1.17).

The measured values, i.e. the coordinates of the extreme points provided from the coordinate determination means, are not exact. That is, they do not easily satisfy equation (1.17). If the measured value (i.e. the one provided from the coordinate determination means) is used for the calculation of the ellipse parameters without regard to equation (1.17) instead of the calculated value, there is the danger of obtaining wrong results from slightly faulty measurement points. Since it is assumed in the deduction of the ellipse parameters that in fact an ellipse is present, the values (i.e. the coordinates used in the calculations) also have to originate from "true" ellipses, that is equation (1.17) (at least approximately) always has to be satisfied by the coordinates provided from the coordinate determination means (as long as the coordinates provided from the coordinate determination means are all based on points belonging to a single ellipse).

In the following, it will be explained how the above-described redundancy can be taken advantage of.

The distance between a value calculated (using equation (1.17)) (for a coordinate of the third ellipse point 280) and a measured value (i.e. directly provided from the coordinate determination means) can be used for assessing a found ellipse. It can be assured that the three extreme points originate from an ellipse in the input image.

If four points are available, the calculation of the ellipse parameters can be performed with three (or altogether five coordinates) each. From four points, for example, three different sets with three points are to be formed. The parameters of the four ellipses calculated therefrom can be averaged to overcome the redundancy when four points are present.

In summary, it can be stated that, based on the previously described concepts, a real-time-capable ellipse recognition on the basis of the Hough transform can be realized. In a first step, extreme values or extreme points of the ellipse (also referred to as first ellipse point, second ellipse point, third ellipse point and fourth ellipse point) are determined. With the aid of a parallel Hough transform or other methods of the pattern recognition, prominent points of the ellipse in an image are sought, from the location of which it is possible to exactly determine the ellipse parameters (i.e. the center described by the coordinates ($x_m$, $y_m$), the semiaxes a and b, as well as the rotation α) or functions of the ellipse parameters, such as a/b.

Prominent points of the ellipse are the x and y coordinates of the extreme values and extreme points in positive and negative x direction as well as in positive and negative y direction of the edge image. The extreme points mentioned are shown in the graphical illustration 200 of FIG. 2a, for example.

For a unique determination of the ellipse parameters, exactly two extreme points of a direction as well as a further coordinate of the third extreme point must be known. For example, it is sufficient if the coordinates ($x_0$, $y_0$) and ($x_2$, $y_2$) and one of the coordinates $x_1$ or $y_1$ or $x_3$ or $y_3$ are known. Likewise, it is sufficient if the coordinates ($x_1$, $y_1$) and ($x_3$, $y_3$) and one of the coordinates $x_0$ or $y_0$ or $x_2$ or $y_2$ are known. In mathematical notation, it may be formulated as follows:

$$((x_0, y_0) \text{ and } (x_2, y_2) \text{ and } (x_1 \text{ or } y_1 \text{ or } x_3 \text{ or } y_3)) \text{ or}$$

$$((x_1, y_1) \text{ and } (x_3, y_3) \text{ and } (x_0 \text{ or } y_0 \text{ or } x_2 \text{ or } y_2))$$

must be known for a determination of the ellipse parameters.

If more information (i.e. more coordinates) is available, the ambiguity of the calculation can be eliminated by suitable methods, such as minimization of the errors. If more points than necessary are known, several ellipses may further be calculated with 2.5 of the (maximally) four known points each. The parameters of these ellipses are averaged and yield the parameters of the result ellipse. In other words, five parameters each (of "2.5 points") can be used to calculate several sets of ellipse parameters. Thereupon, averaging across the several calculated sets of ellipse parameters may take place.

The determination of the extreme points may also be understood as an extreme value search. The extreme value search may take place by the search for circular curves with different radii describing the ellipses (or the ellipse sought) around the extreme points in sufficient approximation. The circular curve search then for example takes place in positive and negative x and y directions, i.e. for example in all four standard directions of a rastered image. Here, the image is analyzed in overlapping strips or image excerpts in each direction.

A method particularly suited for this is the above-described parallel, systolic Hough transform. The parallel, systolic Hough transform is configured for circular curves and adapted for the extreme value search. In every clock on average, the votes of n edge points are formed by a field (array) of delay elements A connected one after the other column by column from the row sums C, while the edge points (the points of the edge image) are pushed through. In other words, a row sum may thus be formed in an $n^{th}$ stage of the Hough field (Hough array), while the points of the edge image are pushed through the $n^{th}$ stage. Each image point is pushed to the next delay element clock by clock, taking the connected bypasses B into account. Each column produces a vote predetermined by the connection of the bypasses B in a number of clocks. The votes indicate on which circular curves the pushed-through point may lie. The votes originating from the columns yield an accumulator column, added in each clock.

Entry into the accumulator can be omitted if it is decided whether a circular curve has been found, by a comparator in each row, using a threshold value. If the threshold value has been exceeded, a bit, which is pushed further with the data clock by clock, is generated at a defined location in a further delay element column with bypasses.

Upon leaving the Hough field or Hough array, i.e. at the output E of the Hough transform means, the formed bits are detected. They give an indication about a coordinate of a detected circular curve, and thus about a coordinate of an extreme point.

For better understanding, it can be imagined that a circular curve pushed into the Hough transform means 600 row by row at F in each column becomes a single straight line in a certain row of the field (array), which results in a (detectable) row sum, by the different configuration of the bypasses of the delay elements.

In order to find all circular and/or extreme values or extreme points, each image column and each image row has to be shifted forward exactly once and once backward through each column of the field (array), wherein its image columns are always shifted through the field (array) only together with its neighbors. FIG. 7a shows the column-wise shifting of an image through the field (array) in one direction. Here, for example, always five adjacent image columns are shifted through at the same time.

Instead of using a field (array) and utilizing it for all four directions, two or four fields (arrays) can be used. If two fields (arrays) thereof are configured so that they transform and/or recognize circular curves with inverse curvature with respect to the two other fields (arrays), the (image) data only has to be shifted forward through the fields (arrays), namely each from the original image as well as from the 90°-rotated image. In the manner described above, the coordinates of the extreme points may then be determined. The typically few extreme points present in an image, the coordinates of which thus only form a small amount of data, must be associated with individual ellipses in a further step. This may for example be done by a personal computer or microcontroller. Due to the small amount of data after the extreme value recognition (i.e. after the determination of the coordinates of the extreme points), no high requirements result here. The inventive concept has the advantage that the processing time is independent of image content. Furthermore, the ellipse parameters can be calculated from only few extreme values. This calculation of the ellipse parameters from the extreme values can be performed extremely quickly and can easily be realized in hardware, e.g. using an FPGA or an ASIC.

In the following, further details with reference to an implementation of the inventive concept in an FPGA architecture will be described. At first, the advantages of the FPGA as opposed to a personal-computer-assisted calculation will be illustrated. In the calculation of the inventive algorithm on a personal computer (PC), all steps have to be executed one after the other.

In the calculation of the algorithm on a PC, all steps have to be executed one after the other. This leads to long computation times in complex algorithms. Moreover, the algorithm developed processes individual bits, which cannot effectively utilize the 32-bit architecture of the PC. Here, the FPGA offers better possibilities. It is an accumulation of logic devices, flip-flops, memories and signal drivers, which may be connected to almost any circuit. This enables adapting the hardware to the algorithm. A further and substantial advantage is the construction of a systolic architecture. In every period of the clock, from rising to rising edge, a combinatorial logic circuit is passed through and the result is stored in a flip-flop, which now provides this result as input value for a further logic circuit. Thus, in each period, new data can be applied at the input of the circuit, and results may further be tapped from the circuit.

Figure 10:
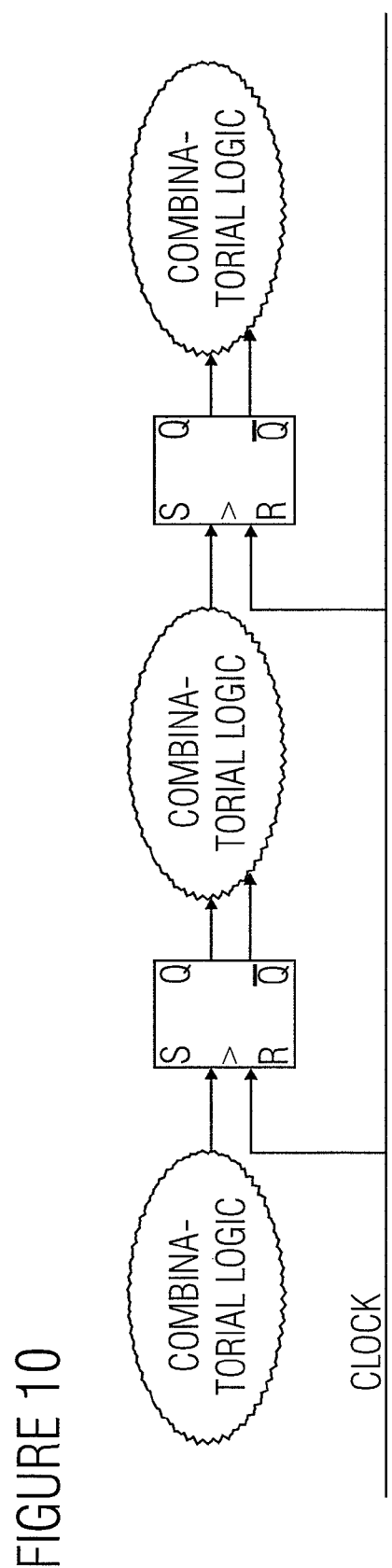
FIG. 10 is a block circuit diagram of an exemplary architecture of a field programmable gate array (FPGA) for implementation of an inventive apparatus.

FIG. 10 shows a block circuit diagram of a corresponding FPGA architecture, in which blocks of combinatorial logic are arranged between outputs and inputs of flip-flops.

The level-sensitive flip-flops provide for the fact that it is not the runtime of the entire logic in the FPGA that determines the period of the clock, but the runtime of the most extensive combinatorial logic between two flip-flops of the entire circuit. Through this architecture, high frequencies of the clock and short processing times can be realized. The hardware used is utilized effectively.

Moreover, the provided target architecture in the FPGA will be described. The intended target architecture provides a bus system (OPB=On Peripheral Bus) with several attached IP (intellectual property) cores, which is controlled by a microcontroller. The IP cores implement the interface functionality, a serial interface (serial port), a PCI interface, etc., as well as the actual image processing.

A soft processor (i.e. a processor for processing machine commands) may be implemented for the control in the FPGA. This "Xilinx Microblaze" soft processor is based on an RISC (reduced instruction set computing) architecture and is interrupt-capable. The IP core established is attached for communication to a standard interface, for example, an OPB-IPIF (on peripheral bus intellectual property interface) in order to communicate with the "Microblaze" soft processor.

In the following, the construction and the function of the Hough transform means, which is also referred to as "Hough core", will be described.

Figure 11:
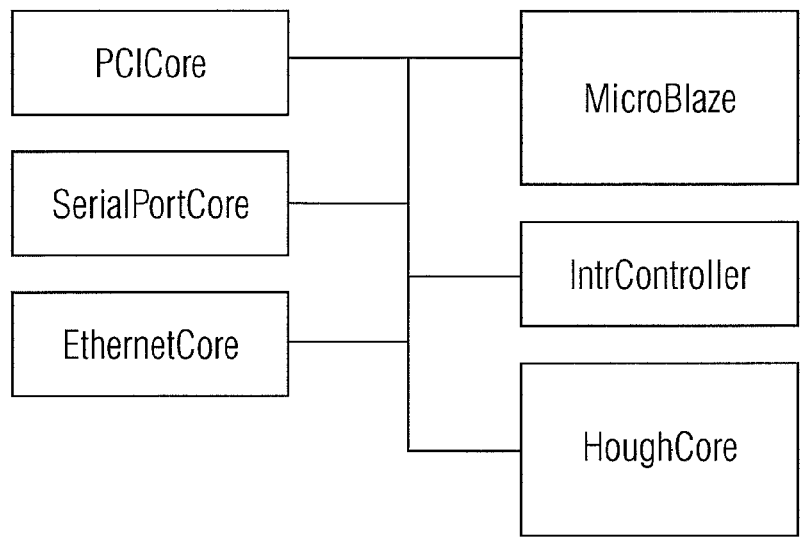
FIG. 11 is a block circuit diagram of an inventive circuit architecture for realization in an FPGA, according to a fourth embodiment of the present invention.
Figure 12:
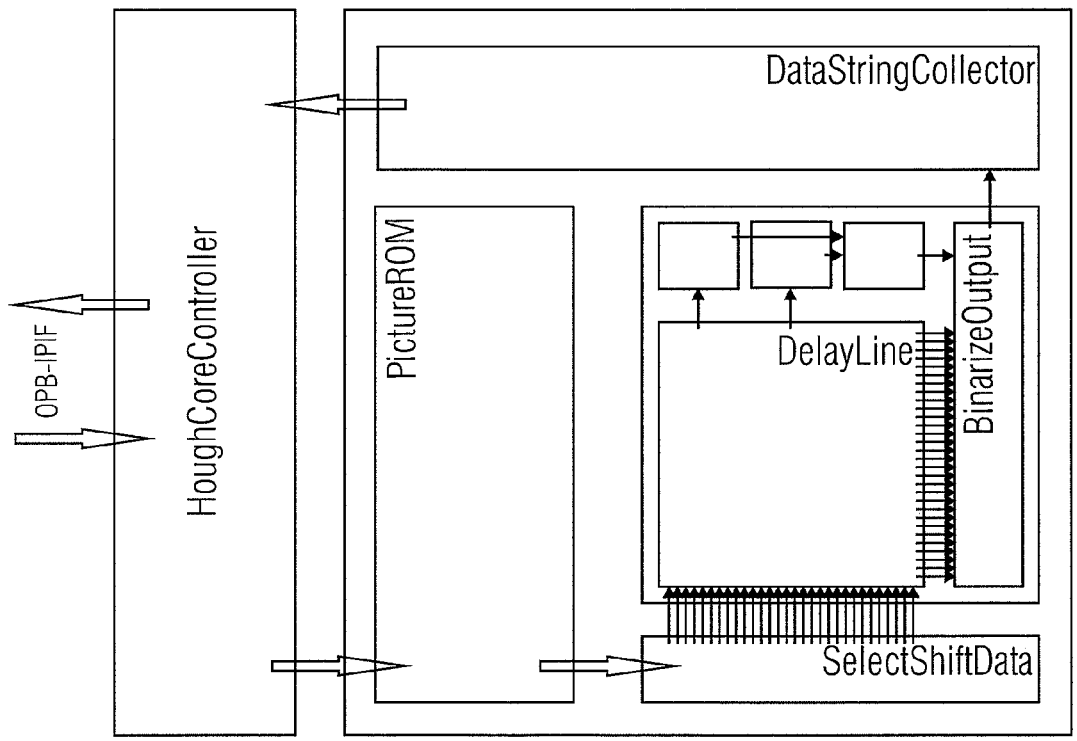
FIG. 12 is a block circuit diagram of an inventive Hough transform means according to a fifth embodiment of the present invention.

FIG. 11 shows a block circuit diagram of an inventive architecture for realization in an FPGA according to a fourth embodiment of the present invention, and FIG. 12 shows a block circuit diagram of an inventive Hough transform means according to a fifth embodiment of the present invention.

A binarized edge image, which is transferred to the OPB-IPIF of the Hough core via the OPB, serves as input signal of the Hough transform means. There it is processed, and results are returned via this path. The Hough core has various components for implementation of the functionality. A Hough-CoreController (from the left in signal flow direction in FIG. 12) provides the interface between OPB-IPIF and Hough core for the control of the Hough transform means and for the data exchange via the OPB, i.e. for the IP control and data communication. In the so-called "picture ROM" (picture read-only memory), the entire edge image, for example up to a size of 512×512 pixels, is stored. The storage is done in memory cells with two access ports (also referred to as "dual-port memory cells"), which form a memory block with random access (write and/or read), also referred to as "block RAM". Each of the two ports may be operated at different clock rates. This enables operating the Hough core at a higher clock rate than it is possible for the soft processor bus system (Microblaze OPB system).

The storage of the image in the memory blocks with random access (BRAMs) is highly advantageous, because the data of the image is accessed several times during processing. Thereby, time of the OPB interface ("OPB time") is saved, which may then be used e.g. for transferring the results or a new image part. The data select and shift means also referred to as (SelectShiftData component), then starts shifting a window of 64×picture height pixels of the image into the delay line row by row. The data select and shift means may be regarded as a giant multiplexer. If a window is processed, the window is shifted one pixel in direction of the picture width.

In the delay line (DelayLine), the individual image points per column proceed at different speeds. On the outside, (i.e. at two edges of the selected image excerpt) this happens more quickly than on the inside (i.e. at the center of the selected image excerpt), so that a circular curve domed upward (i.e. generally a curve with a first direction of curvature) transforms to a straight line and then to a curve domed downward (i.e. a curve with a direction of curvature opposite to the first direction of curvature) step by step.

Depending on the radius of curvature, this (i.e. bending a curved curve straight) happens at different locations (or in different stages) in the delay line, as illustrated in the European patent EP 1 032 891, for example. These locations are to be detected and marked. So as to realize the higher speed, fewer flip-flops are connected to each other at these locations. In other words, at places in the delay line where less delay of a signal is desired, fewer flip-flops are connected into the signal path of a signal than at places in the delay line where higher delay is desired.

Further components constantly calculate the number of edge points going in and out of the delay line (DelayLine). These are used for the calculation of a dynamic threshold value, which is supplied to the binarize output component (BinarizeOutput), the binarize output component including threshold value comparators 634. In other words, the threshold for the comparators 634 is determined depending on how many signals 612, 614, 616 with image content are supplied to the Hough transform means. This is relevant in so far as, especially in the processing of image edges, fewer signals with image information may be available than in a processing of an image excerpt at the center of the image. Thus, the groups of raster columns designated with "0", "1", "2" and "3" in FIG. 7a, for example, include fewer raster columns with image information than the groups of raster columns designated with "4", "5", "6", "7", "8", "9" and "10".

If it happens that one of the row sums of the delay lines (DelayLine) exceeds the threshold value, a (logic) "1" defining this point is generated at the output (for example of the corresponding stage of the delay line). This (logic) "1" is entrained with the data in the delay line. In coordinates of the image, it has its associated place at the center of the window and the respective row. In other words, the logic "1" generated is associated with a point located at about the center of the image with respect to the temporal position, and thus is forwarded in parallel with the associated point through the delay line. The data string collector (DataStringCollector) component now collects 32 bits each of these output bits to a string and makes same available to the HoughCoreController for dispatching. It steadily checks the status of the Hough core. The status of the Hough core may also be queried via the Hough core controller (HoughCoreController) by the soft processor (Microblaze).

Since the (above-mentioned) associated point (also referred to as central point) in the image always lies at the center of the previously mentioned window, only points lying at least 32 pixels (or about half of the width of the window) away from the image edge in horizontal direction can be generated in the output image. So as to find all four limiting points (i.e. all four extreme points of the ellipse), however, the image has to be calculated from all four directions, which cancels out the dead space again. In other words, the above-described analysis of the image in four directions provides for the fact that no dead space develops, in which curves cannot be recognized.

Figure 13:
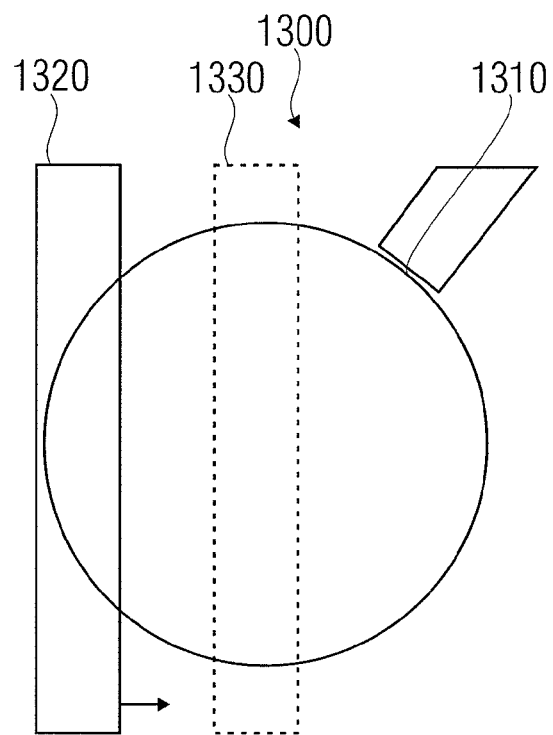
FIG. 13 is a graphical illustration of an image to be processed by an inventive Hough transform means.

FIG. 13 shows a graphical illustration of an image to be processed by an inventive Hough transform means. The image in its entirety is designated with 1300. The image substantially includes a circle, which can be seen as a second line 1310. Furthermore, a first image excerpt 1320 as well as a second image excerpt 1330 can be seen in the image 1300, which can be processed separately by the inventive Hough transform means. The first image excerpt 1320 includes all raster rows of the image in the area of the raster columns used. The second image excerpt 1330 includes just as many raster columns as the first image excerpt 1320, but is shifted as opposed to the first image excerpt 1320 such that the second image excerpt 1330 samples different raster columns to the first image excerpt 1320. Here, it is pointed out that, by definition, raster rows pass horizontally in the graphical illustration 1300 of FIG. 13, whereas raster columns pass vertically. For this reason, the illustration conforms to the graphical illustration 300 of FIG. 3.

FIG. 14 once again schematically illustrates how a bent curve course is bent straight step by step in an inventive Hough transform means. Here, a curve course 1410 represents a curve course of a curve input to the Hough transform means. A second curve course 1420 describes a curve course resulting when the first curve course 1410 has passed through a first stage of the Hough transform means. A third curve course 1430 describes a curve course resulting when the first curve course 1410 has passed through two stages of the Hough transform means. A fourth curve course 1440 describes a curve course resulting when the first curve course 1410 has passed through three stages of the Hough transform means. A fifth curve course 1450 describes a curve course resulting when the first curve course 1410 has passed through four stages of the Hough transform means. It can be seen that the fifth curve course 1450 approximately represents a straight line. Thus, it can be seen that the first curve course 1410 originally input in the Hough transform means is bent straight step by step when passing through several stages of the Hough transform means. The Hough transform means may now recognize when a curve course is bent approximately straight, because a large row sum, which can be recognized by a comparator, then results, as already described above.

Furthermore, FIG. 15 shows a schematic illustration of an exemplary structure of an inventive Hough transform means. The schematic illustration of FIG. 15 is designated with 1500 in its entirety. The Hough transform means 1500 is formed to receive several time signals 1510 in parallel and then forward same in parallel signal paths 1520. When being forwarded in the signal paths 1520, the time signals 1510 pass through delay means, which are designated with A in correspondence with the block circuit diagram 600 of FIG. 6. Various time signals 1510 passing in various signal paths here pass through differently arranged delay means, wherein the number of the delay means passed through altogether also may vary for the various signal paths. Furthermore, it is pointed out that the delay means are arranged in stages 1530 corresponding to the stages 610 according to FIG. 6. If a delay element is included in a particular signal path in a stage 1530, this may be regarded as a bypass, which is designated with B in FIG. 6. Furthermore, it is pointed out that the structure 1500 shown in FIG. 15 substantially corresponds to the structure 600 shown in FIG. 6. In the structure 1500 of FIG. 15, deactivated delay elements are shown as a solid line, whereas a parallel connection of a delay element and a bypass, which can be configured correspondingly, is shown for each stage and for each signals path in the structure 600. Furthermore, it is pointed out that the summing stages 630 (also designated with C) shown in FIG. 6, the comparators 634 (also designated with D), as well as the chain of delay elements 636 are not shown in FIG. 15 for clarity reasons. The structures mentioned are, however, also preferably present in the circuitry 1500 of FIG. 15.

FIG. 16a further shows a graphical illustration of a circle with a recognized extreme point. On the other hand, FIG. 16b shows a graphical illustration of a circle with four recognized extreme points.

Furthermore, it is pointed out that the inventive concept can be implemented both as an apparatus and as a method. Furthermore, the inventive concept may also be executed by a computer program.

FIG. 17 shows a flow chart of an inventive method for determining information about shape and/or location of an ellipse in a graphical image. The flow chart of FIG. 17 is designated with 1700 in its entirety. The method receives a graphical image 1710 and determines therefrom two coordinates of a first ellipse point representing a point of the ellipse located furthest in the first direction, in a first step 1720. To this end, at least one parameter of the first bent line segment approximating the ellipse at the first ellipse point or in a surrounding of the first ellipse point is determined. Based on the at least one parameter of the first bent line segment, the two coordinates of the first ellipse point are determined then.

In a second step 1730, two coordinates of a second ellipse point representing a point of the ellipse located furthest in a direction opposite the first direction, are determined. To this end, at least one parameter of a second bent line segment approximating the ellipse at the second ellipse point or in a surrounding of the second ellipse point is determined. Based on the at least one parameter of the second bent line segment, the two coordinates of the second ellipse point are determined then.

In a final third step 1740, then at least one ellipse parameter of the ellipse is calculated based on the two coordinates of the first ellipse point and the second ellipse point.

It is pointed out that the described method implements the function of the above-described apparatus. The inventive method described may thus be extended by the functionalities described with respect to the inventive apparatus.

Furthermore, it is pointed out that several steps of the described method may also be executed in parallel or in another order.

The inventive concept or method may be implemented in hardware or in software, depending on the conditions. The implementation may be on a digital storage medium, for example a floppy disc, CD, DVD or a flash memory medium, with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. In other words, the invention may thus also be realized as a computer program with a program code for performing the method, when the computer program is executed on a computer.

Altogether, the present invention thus provides a concept enabling to recognize parameters of an ellipse in a graphical image in an especially efficient and hence real-time-suitable manner. The recognition of an ellipse may here be employed advantageously in connection with a multiplicity of technical methods. For example, the viewing direction of a human or animal can be determined by evaluating a video capture of a human eye from which a position of the pupil can be determined, by means of the inventive concept.

Furthermore, employment of the inventive concept in connection with various positioning means or positioning tasks is possible. Ellipse parameters, which may be provided via an interface from the inventive apparatus, may be used to control one or more actuators in order to control motion sequences in a technical system, for example in a material treatment means, when refueling vehicles or when sorting work pieces.

A particular advantage of the inventive concept consists in the fact that here a pattern recognition method for determining extreme points of an ellipse has been combined with an analytical method for calculating the ellipse parameters, whereby substantial efficiency advantages can be achieved as opposed to conventional methods.

The invention claimed is:

1. An apparatus for determining information about shape and/or location of an ellipse in a graphical image, the graphical image comprising a first given direction and a second given direction, comprising:

a coordinate determinator for determining two coordinates of a first ellipse point representing a point of the ellipse located furthest in the first given direction, and for determining two coordinates of a second ellipse point representing a point of the ellipse located furthest in a direction opposite to the first given direction, wherein the coordinate determinator is formed to determine at least one parameter of a first bent line segment approximating the ellipse at the first ellipse point or in a surrounding of the first ellipse point, and to determine the coordinates of the first ellipse point based on the at least one parameter of the first bent line segment, and to determine at least one parameter of a second bent line segment approximating the ellipse at the second ellipse point or in a surrounding of the second ellipse point, and to determine the coordinates of the second ellipse point based on the at least one parameter of the second bent line segment; and an ellipse calculator for calculating at least one ellipse parameter based on the two coordinates of the first ellipse point and the two coordinates of the second ellipse point, wherein the at least one ellipse parameter represents the information about the shape and/or the location of the ellipse.

2. The apparatus according to claim 1, wherein the coordinate determinator further is formed to determine at least one coordinate of a third ellipse point representing a point of the ellipse located furthest in the second direction, wherein the coordinate determinator is formed to determine at least one parameter of a third bent line segment approximating the ellipse at the third ellipse point or in a surrounding of the third ellipse point, and to determine at least one coordinate of the third ellipse point based on the at least one parameter of the third bent line segment, wherein the ellipse calculator is formed to calculate at least one ellipse parameter based on the two coordinates of the first ellipse point, the two coordinates of the second ellipse point and the at least one coordinate of the third ellipse point.

3. The apparatus according to claim 1, wherein the graphical image is a raster image including a plurality of image points arranged in a plurality of raster rows and/or in a plurality of raster columns, wherein the ellipse is described by a plurality of image points forming ellipse points, and/or wherein the first bent line segment can be described by a plurality of adjacent image points, and/or wherein the second bent line segment can be described by a plurality of adjacent image points, and/or wherein the third bent line segment can be described by a plurality of adjacent image points.

4. The apparatus according to claim 3, wherein the coordinate determinator is formed to perform a pattern recognition, using the raster rows and/or the raster columns, in order to identify, in an image excerpt of the image to be identified, which is formed by a plurality of raster rows and/or raster columns, a curve course forming the first bent line segment, and to determine at least one parameter of the identified curve course as a parameter of the first bent line segment.

5. The apparatus according to claim 4, wherein the coordinate determinator is formed to perform a pattern recognition, using the raster rows and/or raster columns, in order to identify, in the image excerpt of the image to be identified, which is formed by the plurality of raster rows and/or raster columns, a curve course forming the first bent line segment, by checking if the image excerpt to be analyzed includes a curve course that is sufficiently similar to a reference curve course from a first set of possible reference curve courses with respect to a given similarity measure, wherein the first set of possible reference curve courses describes admissible courses of the first bent line segment for various parameters of the first bent line segment, and/or to identify, in the image excerpt of the image to be analyzed, which is formed by the plurality of raster rows and/or raster columns, a curve course forming the second bent line segment, by checking if the image excerpt to be analyzed includes a curve course sufficiently similar to a reference curve course from a second set of possible reference curve courses with reference to a given similarity measure, wherein the second set of possible reference curve courses describes admissible courses of the second bent line segment for various parameters of the second bent line segment, and/or to identify, in the image excerpt of the image to be analyzed, which is formed by the plurality of raster rows and/or raster columns, a curve course forming the third bent line segment, by checking if the image excerpt to be analyzed includes a curve course sufficiently similar to a reference curve course from a third set of possible reference curve courses with reference to a given similarity measure, wherein the third set of possible reference curve courses describes admissible courses of the third bent line segment for various parameters of the third bent line segment.

6. The apparatus according to claim 5, wherein the set of possible reference curve courses describes curve courses differing with reference to their location and/or shape, wherein at least one parameter characterizing the location and/or shape is associated with a curve course from the plurality of possible reference curve courses, and wherein the coordinate determinator is formed to derive the parameter of the first bent line segment approximating the ellipse at the first ellipse point, the parameter of the second bent line segment approximating the ellipse at the second ellipse point, or the parameter of the third bent line segment approximating the ellipse at the third ellipse point, from the fact as to which one of the curve courses from the plurality of possible reference curve courses is sufficiently similar to a curve course in the image excerpt with reference to the given similarity measure.

7. The apparatus according to claim 5, wherein the curve courses are chosen from the plurality of possible reference curve courses so that they approximate ellipses of different shape and/or location at the first ellipse point or at the second ellipse point or at the third ellipse point.

8. The apparatus according to claim 5, wherein the curve courses are selected from the plurality of possible reference curve courses so that they describe excerpts from circular curves of different location and/or different radius.

9. The apparatus according to claim 1, wherein the coordinate determinator is formed to apply a pattern recognition to a plurality of image excerpts of the image to be analyzed, in order to identify, in the plurality of image excerpts to be analyzed, a curve course forming the first bent line segment, and to determine a location parameter of the first bent line segment, based on in which one of the plurality of image excerpts of the image the first bent line segment is identified.

10. The apparatus according to claim 9, wherein the coordinate determinator is formed to apply the pattern recognition to the plurality of image excerpts of the image to be analyzed, wherein the image excerpts to be analyzed are chosen so that at least two image excerpts of the plurality of image excerpts to be analyzed overlap.

11. The apparatus according to claim 1, wherein the coordinate determinator is formed to determine at least a further coordinate of the third ellipse point as an additional coordinate, or at least one coordinate of a fourth ellipse point representing a point of the ellipse located furthest in a direction opposite to the second direction, wherein the ellipse calculator is formed to calculate a first set of ellipse parameters including at least one ellipse parameter, based on the two coordinates of the first ellipse point, the two coordinates of the third ellipse point and the first coordinate of the third ellipse point, as well as to calculate a second set of ellipse parameters including at least one ellipse parameter, based on the two coordinates of the first ellipse point, the two coordinates of the second ellipse point and the additional coordinate, and to calculate a result set of ellipse parameters by averaging, using the first set of ellipse parameters and the second set of ellipse parameters.

12. The apparatus according to claim 1, wherein the coordinate calculator is formed to determine two coordinates of the third ellipse point representing a point of the ellipse located furthest in the second direction, and two coordinates of a fourth ellipse point representing a point of the ellipse located furthest in a direction opposite to the second direction, and further to select a plurality of different sets of three ellipse points from the first ellipse point, the second ellipse point, the third ellipse point and the fourth ellipse point, in order to determine associated sets of ellipse parameters for the sets of ellipse points, and to calculate an average set of ellipse parameters as information about the shape and/or the location of the ellipse by averaging of the sets of ellipse parameters belonging to the sets of ellipse points.

13. The apparatus according to claim 1, wherein the coordinate determinator is formed to determine two coordinates of the third ellipse point representing a point of the ellipse located furthest in the second direction, and
wherein the ellipse calculator is further formed to calculate center coordinates of the ellipse from the two coordinates of the first ellipse point and the two coordinates of the second ellipse point,
to perform a coordinate transform of the coordinates of the first ellipse point and of the third ellipse point, in order to obtain transformed coordinates of the first ellipse point and the third ellipse point, wherein the coordinate transform is formed to shift a center of the ellipse described by the center coordinates into a coordinate origin,
to calculate an estimated transformed second coordinate $y_{y,calc}$ of the third ellipse point, using the determination equation $$1 = \frac{y_{y,calc} \cdot x_y}{y_x \cdot x_x}$$

wherein $x_x$ is the transformed first coordinate of the first ellipse point, wherein $y_x$ is the transformed second coordinate of the first ellipse point, and wherein $x_y$ is the transformed first coordinate of the third ellipse point,
and to decide if the third ellipse point belongs to the ellipse described by the first ellipse point and the second ellipse point, based on a deviation between the estimated transformed second coordinate $y_{y,calc}$ of the third ellipse point and the transformed second coordinate $y_y$ of the third ellipse point determined by the coordinate transform.

14. The apparatus according to claim 1,
wherein the ellipse calculator is formed to calculate a first center coordinate $x_m$ of the ellipse, based on the first coordinate $x_3$ of the first ellipse point and the first coordinate $x_1$ of the second ellipse point, using the calculation rule $$x_m = \frac{x_3 + x_1}{2},$$

and/or to calculate a second center coordinate $y_m$ of the ellipse, based on the second coordinate $y_3$ of the first ellipse point and the second coordinate $y_1$ of the second ellipse point, using the calculation rule $$y_m = \frac{y_3 + y_1}{2}.$$

15. The apparatus according to claim 14, wherein the ellipse calculator is further formed to calculate a rotational angle α of the ellipse, a length a of a first semiaxis of the ellipse and/or a length b of a second semiaxis of the ellipse, using the following determination equations:

$$k_x = \frac{x_x}{y_x}; \quad k_y = \frac{x_y}{y_y};$$

$$u = -\frac{1}{2} \cdot (k_x - k_y) \pm \frac{1}{2} \cdot \sqrt{(k_x - k_y)^2 + 4};$$

$$\tan(\alpha) = u;$$

$$\frac{1}{\rho^2} = \frac{b^2}{a^2} = \frac{k_x \cdot u - 1}{u^2 + k_x \cdot u} \text{ or } \frac{1}{\rho^2} = \frac{b^2}{a^2} = \frac{k_y \cdot u - u^2}{k_y \cdot u + 1};$$

$$b = \frac{\rho \cdot \tan\alpha \cdot \left( x_x \cdot \sqrt{\frac{\rho^2 + \tan^2\alpha}{\rho^2}} - x_y \cdot \sqrt{\frac{\rho^2 \cdot \tan^2\alpha + 1}{\rho^2 \cdot \tan^2\alpha}} \right)}{\sin\alpha \cdot (\tan^2\alpha + 1)}$$

$$a = \rho \cdot b$$

wherein u, $k_x$ and $k_y$ are auxiliary quantities;
wherein ρ describes a ratio between a length a of the first semiaxis and a length b of the second semiaxis;
wherein a sign in the determination equation for u is established based on the auxiliary quantities $k_x$ and $k_y$, depending on a location of the first transformed ellipse point and/or the second transformed ellipse point; and
wherein at least one of the two determination equations for ρ is used depending on $k_x$, $k_y$ and u.

16. The apparatus according to claim 1, wherein the coordinate determinator comprises a pattern recognizer, which is formed to receive a plurality of raster rows to be analyzed or of raster columns to be analyzed in form of a plurality of parallel time signals, and to forward the time signals at different speeds in parallel through a plurality of stages connected one behind the other,
wherein at least one predetermined stage includes a summer, which is formed to sum signals coming out of the predetermined stage, in order to form a column sum, and
wherein the pattern recognizer is further formed to evaluate the column sum, in order to determine information about a bent line segment included in the raster rows or raster columns received from the pattern recognizer,
wherein the information includes at least one parameter of the bent line segment included in the received raster rows or raster columns.

17. The apparatus according to claim 16, wherein the predetermined stage further comprises a threshold value recognizer, which is formed to receive and recognize the column sum if at least a predetermined number of signals at the output of the predetermined stage are active at the same time,
wherein the pattern recognizer is further formed to evaluate an output signal of the threshold value recognizer, in order to determine at least one parameter of a bent line segment included in the received raster rows or raster columns.

18. The apparatus according to claim 16, wherein the pattern recognizer is formed to distort a curved curve course, which is described by the signals received by the pattern recognizer, step by step when passing through the stages connected one behind the other, due to the differently fast propagation of the signals, in order to obtain a distorted description of the curved curve course, and to recognize if an approximately straight line represented by a plurality of concurrently active signals in a particular stage is described by the distorted description.

19. The apparatus according to claim 16, wherein the at least one stage of the pattern recognizer is formed to delay several signals in differently strong manner when forwarding same through the stage.

20. The apparatus according to claim 16, wherein the pattern recognizer, by establishing different delays when forwarding the signals through the stages, is formed so that a circularly bent line segment included in the raster rows or raster columns received by the pattern recognizer is deformed approximately to a straight line after passing through a number of stages, wherein the pattern recognizer is formed to recognize presence of an approximately straight line and to determine after passing through how many stages the straight line is present, and wherein the pattern recognizer is further formed to derive at least one parameter of the circularly bent line segment received by the pattern recognizer from the number of stages passed through until the presence of an approximately straight line.

21. The apparatus according to claim 10, wherein the pattern recognizer, by establishing different delays when forwarding the signals through the stages, is formed so that a circularly bent line segment included in the raster rows or raster columns received by the pattern recognizer is deformed approximately to a straight line after passing through a number of stages, wherein the pattern recognizer is formed to recognize presence of an approximately straight line and to derive at least one parameter of the circularly bent line segment received by the pattern recognizer, based on the time instant at which the approximately straight line is present.

22. The apparatus according to claim 10, wherein the coordinate determinator is formed to supply the image to the pattern recognizer twice in form of successively transmitted raster rows to be analyzed, wherein the coordinate determinator is further formed to supply the image to the pattern recognizer for a determination of the two coordinates of the first ellipse point, beginning with a raster row of the image located at a first edge of the image, and to supply the image to the pattern recognizer for a determination of the two coordinates of the second ellipse point, beginning with a raster row of the image located at a second edge of the image, wherein the first edge of the image is opposite to the second edge of the image, and wherein the pattern recognizer is formed to recognize bent line segments with a given direction of curvature.

23. The apparatus according to claim 10, wherein the coordinate determinator includes a first pattern recognizer and a second pattern recognizer, wherein the first pattern recognizer is formed to recognize bent line segments with a first given direction of curvature, wherein the second pattern recognizer is formed to recognize bent line segments with a second direction of curvature opposite to the given first direction of curvature, and wherein the coordinate determinator is formed to supply the image to the first pattern recognizer for a determination of the two coordinates of the first ellipse point, beginning with a raster row located at a first edge of the image, and to provide the image to the second pattern recognizer for a determination of the two coordinates of the second ellipse point, beginning with a raster row located at the first edge of the image.

24. The apparatus according to claim 10, wherein the pattern recognizer is formed to process a first plurality of raster rows to be analyzed as well as a second plurality of raster rows to be analyzed, wherein the first plurality of raster rows to be analyzed and the second plurality of raster rows to be analyzed overlap, and wherein the pattern recognizer is further formed to determine a location parameter of the curve course to be identified based on whether the curve course to be identified is identified in an analysis of the first plurality of raster rows to be analyzed or in an analysis of the second plurality of raster rows to be analyzed.

25. The apparatus according to claim 1, wherein the first direction is orthogonal to the second direction.

26. The apparatus according to claim 1, wherein the apparatus for determining information about the shape and/or the location of an ellipse is formed to receive a binary edge image as graphical image, wherein the binary edge image describes at least one edge by at least one line in form of active image points, whereas locations in the edge image at which no edge is present are described by non-active image points.

27. The apparatus according to claim 1, wherein the apparatus is further formed to derive the graphical image from video data from a video data source.

28. The apparatus according to claim 1, further comprising a data interface or a display device, which is formed to output the information about the shape and/or the location of the ellipse to an electrical processor or a human user.

29. The apparatus according to claim 1, wherein the apparatus for determining information about the shape and/or the location of an ellipse is formed to preprocess the graphical image by a threshold value binarization, in which a light value or a dark value is associated with each image point of the graphical image, depending on the result of a comparison of a color value and/or a brightness value with a threshold value, in order to obtain a binarized image, and further to apply edge detection to the binarized image, wherein the edge detection is formed to generate an edge image from the binarized image, in which edge-shaped transitions from the light value to the dark value in the binarized image are characterized as a line-shaped edge, wherein the coordinate determinator is further formed to process the edge image.

30. The apparatus according to claim 1, wherein the apparatus is further formed to obtain the graphical image from a video camera arranged to capture a pupil of a human eye, and wherein the apparatus further includes a data interface formed to transmit the information about the shape and/or the location of the ellipse to an apparatus for calculating a viewing direction of the human eye.

31. A method for determining information about shape and/or location of an ellipse in a graphical image, the image comprising a first given direction and a second given direction, comprising: determining, using a computer, two coordinates of a first ellipse point representing a point of the ellipse located furthest in the first given direction, determining, using a computer, two coordinates of a second ellipse point representing a point of the ellipse located furthest in a direction opposite to the first given direction, wherein determining the two coordinates of the first ellipse point includes determining at least one parameter of a first bent line segment approximating the ellipse at the first ellipse point or in a surrounding of the first ellipse point, as well as determining the coordinates of the first ellipse point, based on the at least one parameter of the first bent line segment, and wherein determining the two coordinates of the second ellipse point includes determining at least one parameter of a second bent line segment approximating the ellipse at the second ellipse point or in a surrounding of the second ellipse point, as well as determining the coordinates of the second ellipse point, based on the at least one parameter of the second bent line segment; and calculating, using a hardware, at least one ellipse parameter of the ellipse, based on the two coordinates of the first ellipse point and the two coordinates of the second ellipse point, wherein the at least one ellipse parameter represents information about the shape and/or the location of the ellipse.

32. A method for determining information about shape and/or location of an ellipse in a graphical image, the image comprising a first given direction and a second given direction, comprising: determining, using a computer, two coordinates of a first ellipse point representing a point of the ellipse located furthest in the first given direction, determining, using a computer, two coordinates of a second ellipse point representing a point of the ellipse located furthest in a direction opposite to the first given direction, wherein determining the two coordinates of the first ellipse point includes identifying a first bent line segment approximating the ellipse at the first ellipse point or in a surrounding of the first ellipse point, determining at least one parameter of the identified first bent line segment, as well as determining the coordinates of the first ellipse point, based on the at least one parameter of the identified first bent line segment, and wherein determining the two coordinates of the second ellipse point includes identifying a second bent line segment approximating the ellipse at the second ellipse point or in a surrounding of the second ellipse point, determining at least one parameter of the identified second bent line segment, as well as determining the coordinates of the second ellipse point, based on the at least one parameter of the identified second bent line segment, and calculating, using a computer, at least one ellipse parameter of the ellipse, based on the two coordinates of the first ellipse point and the two coordinates of the second ellipse point, wherein the at least one ellipse parameter represents information about the shape and/or the location of the ellipse.

33. A computer program for performing, when the computer program is executed on a computer, a method for determining information about shape and/or location of an ellipse in a graphical image, the image comprising a first direction and a second direction, the method comprising:

determining two coordinates of a first ellipse point representing a point of the ellipse located furthest in the first direction, determining two coordinates of a second ellipse point representing a point of the ellipse located furthest in a direction opposite to the first direction, wherein determining the two coordinates of the first ellipse point includes determining at least one parameter of a first bent line segment approximating the ellipse at the first ellipse point or in a surrounding of the first ellipse point, as well as determining the coordinates of the first ellipse point, based on the at least one parameter of the first bent line segment, and wherein determining the two coordinates of the second ellipse point includes determining at least one parameter of a second bent line segment approximating the ellipse at the second ellipse point or in a surrounding of the second ellipse point, as well as determining the coordinates of the second ellipse point, based on the at least one parameter of the second bent line segment; and calculating at least one ellipse parameter of the ellipse, based on the two coordinates of the first ellipse point and the two coordinates of the second ellipse point, wherein the at least one ellipse parameter represents information about the shape and/or the location of the ellipse.

34. A computer program for performing, when the computer program is executed on a computer, a method for determining information about shape and/or location of an ellipse in a graphical image, the image comprising a first direction and a second direction, the method comprising:

determining two coordinates of a first ellipse point representing a point of the ellipse located furthest in the first direction, determining two coordinates of a second ellipse point representing a point of the ellipse located furthest in a direction opposite to the first direction, wherein determining the two coordinates of the first ellipse point includes identifying a first bent line segment approximating the ellipse at the first ellipse point or in a surrounding of the first ellipse point, determining at least one parameter of the identified first bent line segment, as well as determining the coordinates of the first ellipse point, based on the at least one parameter of the identified first bent line segment, and wherein determining the two coordinates of the second ellipse point includes identifying a second bent line segment approximating the ellipse at the second ellipse point or in a surrounding of the second ellipse point, determining at least one parameter of the identified second bent line segment, as well as determining the coordinates of the second ellipse point, based on the at least one parameter of the identified second bent line segment, and calculating at least one ellipse parameter of the ellipse, based on the two coordinates of the first ellipse point and the two coordinates of the second ellipse point, wherein the at least one ellipse parameter represents information about the shape and/or the location of the ellipse.

\* \* \* \* \*